(12) United States Patent
Gui et al.

(10) Patent No.: US 11,912,898 B2
(45) Date of Patent: Feb. 27, 2024

(54) LIGHT COLOR CONDUCTIVE COATINGS

(71) Applicant: Cabot Corporation, Boston, MA (US)

(72) Inventors: Zhangliang Gui, Shanghai (CN); Jin-nan Liu, Shanghai (CN); Shi-Lin Wang, Shanghai (CN)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 17/910,174

(22) PCT Filed: Mar. 11, 2021

(86) PCT No.: PCT/CN2021/080160
§ 371 (c)(1),
(2) Date: Sep. 8, 2022

(87) PCT Pub. No.: WO2021/180158
PCT Pub. Date: Sep. 16, 2021

(65) Prior Publication Data
US 2023/0146093 A1   May 11, 2023

(30) Foreign Application Priority Data
Mar. 12, 2020   (WO) ................ PCT/CN2020/078992

(51) Int. Cl.
*C09D 5/24* (2006.01)
*C09D 7/20* (2018.01)
(Continued)

(52) U.S. Cl.
CPC ................ *C09D 5/24* (2013.01); *C09D 7/20* (2018.01); *C09D 7/61* (2018.01); *C09D 7/66* (2018.01); *C09D 7/70* (2018.01)

(58) Field of Classification Search
CPC .. C08K 3/041; C08K 3/22; C08K 2003/2241; C09D 17/004; C09D 5/24; C09D 7/20;
(Continued)

(56) References Cited

U.S. PATENT DOCUMENTS 9,214,256 B2   12/2015   Sivarajan et al.
2009/0001326 A1*  1/2009  Sato ........................ C09D 7/70
                                                     423/447.2
(Continued)

FOREIGN PATENT DOCUMENTS

JP   2005/209458 A   8/2005
TW    201524905 A    7/2015
(Continued)

OTHER PUBLICATIONS

Younes, H., et al., "Processing and Property Investigation of High-Density Carbon Nanostructured Papers with Superior Conductive and Mechanical Properties", Diamond & Related Materials, 68 (2016), pp. 109-117.
(Continued)

*Primary Examiner* — Mark Kopec
*Assistant Examiner* — Jaison P Thomas

(57) ABSTRACT

A CNS millbase dispersion, comprises a solvent and up to 0.5 wt % of at least one CNS-derived material dispersed in the millbase dispersion and selected from the group consisting of: carbon nanostructures, fragments of carbon nanostructures, fractured carbon nanotubes, and any combination thereof. The carbon nanostructures or fragments of carbon nanostructures include a plurality of multiwall carbon nanotubes that are crosslinked in a polymeric structure by being branched, interdigitated, entangled and/or sharing common walls, and the fractured carbon nanotubes are derived from the carbon nanostructures and are branched and share common walls with one another. A Brookfield viscosity of the dispersion measured at room temperature at 10 rpm is less than 3000 cP.

14 Claims, 6 Drawing Sheets

(51) Int. Cl.
*C09D 7/40* (2018.01)
*C09D 7/61* (2018.01)

(58) Field of Classification Search
CPC ... C09D 7/61; C09D 7/66; C09D 7/70; H01B 1/24
See application file for complete search history.

(56) References Cited

U.S. PATENT DOCUMENTS

| | | |
|---|---|---|
| 2009/0134363 A1 | 5/2009 | Bordere et al. |
| 2009/0152508 A1 | 6/2009 | Handa et al. |
| 2015/0099153 A1 | 4/2015 | Guo et al. |
| 2016/0185983 A1 | 6/2016 | Lui et al. |
| 2018/0159122 A1 | 6/2018 | Guo et al. |

FOREIGN PATENT DOCUMENTS

| | | |
|---|---|---|
| WO | WO 02/076724 A1 | 10/2002 |
| WO | WO 2008/056851 A1 | 5/2008 |
| WO | WO 2009/055831 A1 | 4/2009 |

OTHER PUBLICATIONS

The International Search Report and The Written Opinion of The International Search Authority, or the Declaration of International Application No. PCT/CN2020/078992, dated Dec. 7, 2020.
The International Search Report and The Written Opinion of The International Search Authority, or the Declaration of International Application No. PCT/CN2021/080160, dated Jun. 28, 2021.

\* cited by examiner

LIGHT COLOR CONDUCTIVE COATINGS

This application is the national phase of PCT application PCT/CN2021/080160, filed Mar. 11, 2021, which claims priority from PCT application PCT/CN2020/078992, filed Mar. 12, 2020.

BACKGROUND OF THE INVENTION

1. Field of the Invention

This invention relates to the use of carbon nanostructures in conductive coatings, for example, primers for decorative and protective coatings and transparent coatings.

2. Description of the Related Art

The bodies of automobiles and other vehicles have traditionally been made from sheet metal. Metal parts can be manufactured to have smooth, glossy surfaces that provide a shiny, sleek appearance that is desirable for automobiles and other vehicles. Typically, metal body parts are attached to the chassis of the vehicle and then applied with several layers of primers and coatings to achieve the final color and gloss. The electrical conductivity of metals allow the application of these primers and coatings via electrostatic spraying.

It would be desirable to make vehicle exterior parts from polymeric materials because of their light weight relative to metal and the ease with which they can be molded into parts with intricate and complicated shapes. However, most polymeric materials are electrical insulators. Thus, it is desirable to have a surface treatment for polymer materials that would enable the use of electrostatic methods to apply coatings.

Polymer materials are also used to produce protective films for electronic displays and packaging trays, carrier tapes, and other packaging components for electronic parts and components. Such polymers are often not able to dissipate static electricity, which can damage the electronics.

Conductive fillers can be used to impart electrical conductivity to polymer materials, but the required loading of materials such as carbon black or metallic powders may impart color and/or block light transmission as well. A dark color may be difficult to cover with a light color, e.g., for an automobile, and opacity may obscure the view of electronic displays or make it difficult for both people and automated equipment to see packaged electronics.

Thus, it is desirable to have a surface treatment for polymers and other materials that can impart electrical conductivity while providing other aesthetic benefits such as transparency or ease of coverage with other colored coatings.

SUMMARY OF THE INVENTION

In one aspect, a curable coating composition contains a resin and up to 10 wt % CNS derived material on a dry basis. In some embodiments, curable coating compositions and coatings contain up to 7 wt %, for example, from 1 wt % to 7 wt %, from 2 wt % to 6 wt %, or from 3 wt % to 5 wt % carbon nanostructures, fragments of carbon nanostructures and/or fractured carbon nanotubes on a dry basis.

The composition is prepared using carbon nanostructures (CNSs, singular CNS), a term that refers herein to a plurality of carbon nanotubes (CNTs) that that are crosslinked in a polymeric structure by being branched, e.g., in a dendrimeric fashion, interdigitated, entangled and/or sharing common walls with one another. Operations conducted to prepare the compositions described herein can generate CNS fragments and/or fractured CNTs. Fragments of CNSs are derived from CNSs and, like the larger CNS, include a plurality of CNTs that are crosslinked in a polymeric structure by being branched, interdigitated, entangled and/or sharing common walls. Fractured CNTs are derived from CNSs, are branched and share common walls with one another. Without being held to any specific interpretation, it is believed that the fragments of CNSs and/or the fractured CNTs are derived or generated from CNSs during one or more processing steps (e.g., operations undertaken to disperse or mix the initial CNSs into a carrier) involved in preparing the systems described herein.

Highly entangled CNSs are macroscopic in size and can be considered to have a carbon nanotube (CNT) as a base monomer unit of its polymeric structure. For many CNTs in the CNS structure, at least a portion of a CNT sidewall is shared with another CNT. While it is generally understood that every carbon nanotube in the CNS need not necessarily be branched, crosslinked, or share common walls with other CNTs, at least a portion of the CNTs in the carbon nanostructure can be interdigitated with one another and/or with branched, crosslinked, or common-wall-sharing carbon nanotubes in the remainder of the carbon nanostructure.

In specific examples, the CNS is provided at a loading of 0.01 to 1 weight % of the formulation. In many cases, a loading of less than or equal to 0.5 wt % can result in a surface resistivity of the coating that is lower than $10^7$ ohm/square but with low tint, e.g., L* of at least 55, at least 60, at least 70, or at least 80. Darker coatings may also be acceptable, for example, with L* of at least 30, at least 40, or at least 50.

CNSs may present various advantages over ordinary CNTs, possibly due to the CNS unique structure. Also, in contrast to CNTs, CNSs can be provided in forms (powders, for instance) that are easy and safe to handle on the industrial scale. In some cases, CNSs form stable dispersions in a desired solvent.

The invention presents many other advantages. As already noted, for example, the CNSs employed can generate fragments of CNSs (including partially fragmented CNSs) and/or fractured CNTs. These structures can bring about improved connectivity between one another, thereby enhancing electrical conductivity. While the use of CNSs can result in the formation of a flexible conductive network with good coverage within the coating at low loading, the low tinting strength means even light-colored coatings will exhibit the desired hue when deposited over primer coatings containing CNSs. Likewise, transparent coatings containing CNSs can provide the desired visibility to the underlying surface while still exhibiting electrical conductivity.

In one embodiment, a coating composition comprises a resin and up to 10 wt % on a dry basis of at least one CNS-derived material dispersed in the coating composition and selected from the group consisting of: carbon nanostructures, fragments of carbon nanostructures, fractured carbon nanotubes, and any combination thereof. The carbon nanostructures or fragments of carbon nanostructures include a plurality of multiwall carbon nanotubes that are crosslinked in a polymeric structure by being branched, interdigitated, entangled and/or sharing common walls, the fractured carbon nanotubes are derived from the carbon nanostructures and are branched and share common walls with one another, and when tested according to Evaluation Method A, the resulting cured coating has a surface resistivity of at most 107 ohm/square, a value of L* of at least 30, or both. For example, the cured coating may have a value of L* of at least 30, at least 40, at least 50, at least 55, at least 60, at least 70, at least 80, at least 90, from 30 to 80, or from 40 to 70.

When tested according to Evaluation Method B, the resulting cured coating may have a transparency greater than 55% and resistivity (ohm/sq) satisfying $\log_{10}$(surface resistivity)≤0.005(transparency)$^2$−0.52(transparency)+19, where transparency is given as a percent. The CNS-derived material may be coated or in a mixture with a binder. The resin may be selected from the group consisting of acrylic, methacrylic, alkyd, polyester, urethane, epoxy, vinyl-chloride copolymer, phenolic, epoxy bisphenol-A, epoxy novolac, polystyrene resins, styrene-acrylic resins, polyvinyl butyral, polyolefin, and cellulosic resins. For example, the resin may be is selected from the group consisting of acrylic, methacrylic, alkyd, polyester, urethane, epoxy, phenolic, epoxy bisphenol-A, epoxy novolac, polystyrene resins, styrene-acrylic resins, polyolefin, and cellulosic resins. The coating composition may further include at least one additive selected from titania, hydrophilic fumed silica, hydrophobic fumed silica, hydrophilic precipitated silica, hydrophobic precipitated silica, clay, bentonite, talc, metal carbonates, and calcium carbonate, for example, titania. A cured coating produced by curing the coating composition of any of these embodiments may include 0.01-10 wt % CNS-derived material, for example, 0.05 to 7 wt % CNS-derived material. The cured coating may further include 20-30 wt % titania and have a value of L* of at least 55.

In another embodiment, a CNS millbase dispersion comprises a solvent and up to 0.5 wt % of at least one CNS-derived material dispersed in the coating composition and selected from the group consisting of: carbon nanostructures, fragments of carbon nanostructures, fractured carbon nanotubes, and any combination thereof. The carbon nanostructures or fragments of carbon nanostructures include a plurality of multiwall carbon nanotubes that are crosslinked in a polymeric structure by being branched, interdigitated, entangled and/or sharing common walls, the fractured carbon nanotubes are derived from the carbon nanostructures and are branched and share common walls with one another, and a Brookfield viscosity of the dispersion measured at room temperature at 10 rpm is less than 3000 cP.

The solvent may be aqueous or non-aqueous. The CNS millbase dispersion may further include a dispersant. The CNS-derived material may be coated or in a mixture with a binder. A coating composition may comprise the millbase dispersion and a resin. The resin may be selected from the group consisting of acrylic, methacrylic, alkyd, polyester, urethane, epoxy, vinyl-chloride copolymer, phenolic, epoxy bisphenol-A, epoxy novolac, polystyrene resins, styrene-acrylic resins, polyvinyl butyral, polyolefin, and cellulosic resins. When the coating composition is tested according to Evaluation Method A, the resulting cured coating may have a surface resistivity of at most $10^7$ ohm/square, a value of L* of at least 30, or both. When tested according to Evaluation Method B, the resulting cured coating may exhibit transparency greater than 55% and resistivity (ohm/sq) satisfying $\log_{10}$(surface resistivity)≤0.005(transparency)$^2$−0.52(transparency)+19, where transparency is given as a percent. When the coating composition is cured to form a coating, the resulting cured coating may contain from 0.10 to 10 wt % CNS-derived material. The resin may be selected from the group consisting of the resin is selected from the group consisting of acrylic, methacrylic, alkyd, polyester, urethane, epoxy, phenolic, epoxy bisphenol-A, epoxy novolac, polystyrene resins, styrene-acrylic resins, polyolefin, and cellulosic resins. The coating composition may further include at least one additive selected from titania, hydrophilic fumed silica, hydrophobic fumed silica, hydrophilic precipitated silica, hydrophobic precipitated silica, clay, bentonite, talc, metal carbonates, and calcium carbonate, for example, titania. The coating composition may be cured to prepare a cured coating having a value of L* of at least 55.

In another embodiment, a method of producing a coating composition comprises providing a millbase comprising at least one CNS-derived material dispersed in a solvent and selected from the group consisting of: carbon nanostructures, fragments of carbon nanostructures, fractured carbon nanotubes, and any combination thereof, and combining the CNS millbase with a resin to form a coating composition which, when it is tested according to Evaluation Method A, the resulting cured coating has a surface resistivity of at most $10^7$ ohm/square. The carbon nanostructures or fragments of carbon nanostructures include a plurality of multiwall carbon nanotubes that are crosslinked in a polymeric structure by being branched, interdigitated, entangled and/or sharing common walls, and the fractured carbon nanotubes are derived from the carbon nanostructures and are branched and share common walls with one another.

The millbase may include up to 0.5 wt % CNS-derived material. The resin may be selected from the group consisting of acrylic, methacrylic, alkyd, polyester, urethane, epoxy, vinyl-chloride copolymer, phenolic, epoxy bisphenol-A, epoxy novolac, polystyrene resins, styrene-acrylic resins, polyvinyl butyral, polyolefin, and cellulosic resins, for example, from the group consisting of acrylic, methacrylic, alkyd, polyester, urethane, epoxy, phenolic, epoxy bisphenol-A, epoxy novolac, polystyrene resins, styrene-acrylic resins, polyolefin, and cellulosic resins. The solvent may be aqueous or non-aqueous. The millbase may further include a dispersant. The millbase may have a Brookfield viscosity measured at room temperature at 10 rpm of less than 3000 cP. When the coating composition is tested according to Evaluation Method B, the resulting cured coating may have a transparency greater than 55% and resistivity (ohm/sq) satisfying $\log_{10}$(surface resistivity)≤ 0.005(transparency)$^2$−0.52(transparency)+19, where transparency is given as a percent.

In another embodiment, a cured coating comprises a cured resin and at least one CNS-derived material dispersed in a solvent and selected from the group consisting of: carbon nanostructures, fragments of carbon nanostructures, fractured carbon nanotubes, and any combination thereof. The carbon nanostructures or fragments of carbon nanostructures include a plurality of multiwall carbon nanotubes that are crosslinked in a polymeric structure by being branched, interdigitated, entangled and/or sharing common walls, and the fractured carbon nanotubes are derived from the carbon nanostructures and are branched and share common walls with one another. The cured coating has a surface resistivity of at most $10^7$ ohm/square.

The cured coating may have a value of L* of at least 30, at least 40, at least 50, at least 55, at least 60, at least 70, at least 80, at least 90, from 30 to 80, or from 40 to 70. The CNS-derived material may be coated or in a mixture with a binder. The resin may be selected from the group consisting of acrylic, methacrylic, alkyd, polyester, urethane, epoxy, vinyl-chloride copolymer, phenolic, epoxy bisphenol-A, epoxy novolac, polystyrene resins, styrene-acrylic resins, polyvinyl butyral, polyolefin, and cellulosic resins, for example, selected from the group consisting of acrylic, methacrylic, alkyd, polyester, urethane, epoxy, phenolic, epoxy bisphenol-A, epoxy novolac, polystyrene resins, styrene-acrylic resins, polyolefin, and cellulosic resins. The cured coating may further include at least one additive selected from titania, hydrophilic fumed silica, hydrophobic fumed silica, hydrophilic precipitated silica, hydrophobic precipitated silica, clay, bentonite, talc, metal carbonates, and calcium carbonate, for example, titania.

It is to be understood that both the foregoing general description and the following detailed description are exemplary and explanatory only and are intended to provide further explanation of the present invention, as claimed.

BRIEF DESCRIPTION OF THE DRAWING

The invention is described with reference to the several figures of the drawing, in which.

DETAILED DESCRIPTION OF THE INVENTION

Figure 1A:
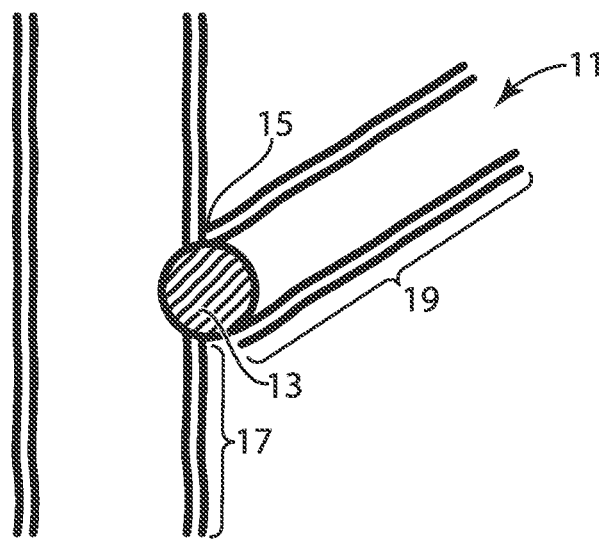
FIGS. 1A and 1B are diagrams illustrating differences between a Y-shaped MWCNT, not in or derived from a carbon nanostructure (FIG. 1A), and a branched MWCNT (FIG. 1B) in a carbon nanostructure.

In one aspect, a coating composition contains a resin and up to 10 wt % carbon nanostructures (CNSs) and/or CNS-derived material on a dry basis, e.g., 7 wt %, for example, from 1 wt % to 7 wt %, from 2 wt % to 6 wt %, or from 3 wt % to 5 wt % CNS-derived material. The coating composition exhibits a jetness represented by L* of at least 30 or at least 55, for example, at least 30, at least 40, at least 50, at least 55, at least 60, at least 70, at least 80, or at least 90, from 30 to 80, or from 40 to 70. The coating composition may exhibit a surface resistivity less than $10^7$ ohm/square. Specific aspects of the invention may relate to coating compositions that include a resin and CNSs, fragments of CNSs, and/or fractured CNTs. Alternatively or in addition, the coating composition may include higher amounts of CNSs and CNS-derived material but may then have L* less than 55.

Most coatings are applied as either liquids or solids. Powder coatings, for instance, are applied as a solid while many coatings are applied as a liquid that can then be converted to a solid. As used herein, a "liquid coating" is a liquid coating dispersion including a dispersed pigment that is to be applied to a substrate. A liquid coating includes a liquid carrier and additional components that may be dissolved, dispersed or suspended therein. A liquid coating is typically converted to a solid coating by drying after application to a substrate. A solid coating, or "coating," is not a liquid but may contain traces of solvents or other fluids. Any pigment particles in a coating are fixed and are not free to move. Conversion from a liquid coating to a coating may occur, for example, by evaporation of a solvent and/or polymerization of a resin or other polymeric material. A liquid coating is in condition to be applied to a substrate without further dilution, unlike a millbase which is to be let down prior to application.

In general, a liquid coating composition comprises a pigment dispersed in a solvent and a binder or curable resin (the vehicle). The vehicle for the coating compositions of the present invention can be either an aqueous vehicle or a non-aqueous vehicle. Thus, the resulting compositions can be either an aqueous coating composition or a non-aqueous coating composition.

The composition of the vehicle can vary depending on the conditions and requirements for the final coating. For example, the curable resin content can vary between about 70-100%. Solvent content may vary between nearly 0% and 80%. Non-aqueous solvents may be water miscible, and aqueous solvents may include water soluble or water miscible organic solvents such as alcohols. Aqueous solvents may comprise at least 50 wt % water, for example, at least 60 wt %, at least 70%, at least 80%, or at least 90% water.

Specific examples of non-aqueous solvents include aromatic hydrocarbons such as xylene, acetate solvents such as butyl acetate and ethyl acetate, aliphatic hydrocarbons, alcohols such as butanol, 1-methyl-2 propanol and methanol, glycols and polyalcohols such as diethyleneglycol, ketones such as acetone, cyclohexanone, 2-heptanone, methylbutyl ketone, and methylethyl ketone, esters such as n-butyl propionate, amides such as dimethylformamide, sulfoxides such as dimethylsulfoxide, and the like. Additional suitable solvents include but are not limited to ethylcellosolve, ethylcellosolve acetate, ethylcarbitol acetate, propylene glycol monomethyl ether, propylene glycol monomethyl ether acetate, lactate esters, dimethylacetamide, and mixtures of any of the solvents listed above. Non-aqueous and aqueous solvents may also be mixed.

Examples of curable resins or binders useful for either or both of the aqueous and non-aqueous coating compositions of the present invention include, but are not limited to, acrylic, methacrylic, alkyd, polyester, urethane, epoxy, vinyl-chloride copolymer, and cellulosic resins. Phenolic resins, such as epoxy bisphenol-A or epoxy novolac resins, polystyrene resins, styrene-acrylic resins, poly vinyl butyral, or polyolefin resins may be used as well. The binder or curable resin may be cured thermally or by any source of radiation such as, for example, ultraviolet radiation. Likewise, polymers, oligomers, and monomers in the curable coating composition may be thermally or radiation polymerizable or cross-linkable. For example, monomers or oligomers of these resins or other resins or polymers, such as polyesters, acrylates, methacrylates, epoxides, terminal alkenes, diisocyanates, diols, diamines and styrenics, may be included in the uncured coating composition in addition to or as alternatives to the curable resins listed above. Prepolymers for polyurethanes and polyureas, such as hydroxyl-, amine-, or isocyanate-terminated oligomers, may also be employed. In this way, the uncured coating composition may be photosensitive (i.e. may be cured by irradiation) or thermosensitive (i.e., may be cured by changing temperature, such as by heating). Alternatively or in addition, the curable coating composition may be cured by removal of the solvent. When the components of the curable coating composition are curable by irradiation, the curable coating composition may further include a photoinitiator, which generates a radical on absorbing light.

Alternatively or in addition, the binder may be employed in dispersion or latex form. Such binders may be especially suited for aqueous coating systems. For example, the polymeric binder may be a latex of acrylate or methacrylate copolymers (such as NeoCryl® materials from NSM Neoresins, the AC and AS polymers from Alberdingk-Boley) or may be a water dispersible polyurethane (such as ABU from Alberdingk-Boley) or polyester (such as AQ polymers from Eastman Chemical). Polymers, such as those listed above, variations and related materials, that can be used for binders in aqueous coatings are included in the Joncryl® polymers from BASF, the NeoCryl materials from DSM Neoresins, and the AC and AS polymers from Alberdingk-Boley.

The curable coating composition may also contain optional additives which can be used to improve such properties as viscosity, leveling, and dry time. Examples include cosolvents (in particular, water soluble solvents for aqueous coatings), surfactants, dispersants, and fillers such as clays, talc, hydrophilic and hydrophobic fumed and precipitated silicas, and metal carbonates such as calcium carbonate. Additionally, adhesion promoters, flow modifiers, leveling aids, and biocides can be added. Additional pigments such as titanium oxide may also be employed.

Specific examples of cosolvents include but are not limited to the materials listed above as solvents, such solvents as butyl acetate, ethylcellosolve, ethylcellosolve acetate, butylcellosolve, butylcellosolve acetate, ethylcarbitol, ethylcarbitol acetate, diethyleneglycol, cyclohexanone, propyleneglycol monomethylether, propyleneglycol monomethylether acetate, lactate esters, and mixtures thereof.

The CNSs, fragments of CNSs, and/or fractured CNTs may be used in conjunction with a dispersant. The dispersant generally includes a material capable of facilitating the dispersion of the CNSs in the solvent (e.g., via a steric hindrance mechanism and/or an electrostatic charge mechanism), while keeping the viscosity of the compositions sufficiently low to enable practical processing of the compositions, e.g. 10000 cP at room temperature, for example less than 5000 cP, less than 3000 cP, less than 2500 cP, less than 2000 cP, less than 1000 cP, or less than 500 cP, for example, from 400 to 3000 cP. Dispersants associate strongly with particles and are selected for their ability to keep particles apart. Dispersants can include surfactants, functionalized polymers and oligomers. Dispersants may be non-ionic dispersants or may be ionic dispersants which include both anionic and cationic dispersants. Non-ionic dispersants are preferred and among ionic dispersants, anionic dispersants are preferred. Dispersants may be amphiphilic and may be polymeric or include a polymeric group. Dispersants do not include other additives that may be used in aqueous coatings such as wetting agents, defoamers and cosolvents.

The concentration of the dispersant in the compositions can vary, depending on the composition(s) of the dispersant used, and the specific type(s) and concentrations of CNS, the polymer, and the solvent. In some embodiments, the concentration of the dispersant is best expressed as a ratio of the dispersant to the CNS material, by weight. This weight ratio can range from no dispersant to up to five times (5x) the amount of CNS in the composition on a weight basis, for example, up to 0.5x, 1x, up to 2x, up to 3x, up to 4x, or from 0.25x to 5x. However, because so little CNS is required to achieve the resistivity and color provided by various embodiments herein, 5x still does not result in a large amount of dispersant in the formulated composition.

Specific examples of polymeric dispersants include synthetic polymeric dispersants. Suitable molecular groups that may be included in dispersants include but are not limited to polyalkylene oxides such as polyethylene oxide, polypropylene oxide, and mixtures and copolymers thereof, polyesters such as polycaprolactones, polyvalerolactones, poly (hydroxystearic acid), and poly(hydroxyoleic acid), polyamides such as polycaprolactam, polyacrylates, and block copolymers having both hydrophilic and hydrophobic groups. Additional examples include amine-functionalized derivatives (such as polyamine, tertiary amine, or quaternary ammonium functionalized derivatives) of any of these, such as amine-functionalized or amine-terminated polyalkylene oxides (e.g., Jeffamine dispersants available from Huntsman) or acrylic polymers including amine or acid functional groups. Ethoxylates such as alkylphenol ethoxylates and alkyl ethoxylates are commonly used in waterborne formulations as dispersants. Examples include PETROLITE dispersants from Baker Petrolite. Additional polymers and related materials that can be used for dispersants and additives in aqueous coatings are included in the Tego products from Evonik, the Ethacryl products from Lyondell, the Joncryl polymers and EFKA dispersants from BASF, Solsperse™ dispersants available from Lubrizol, and the Disperbyk® and Byk® dispersants from BYK.

Various rheology modifiers can also be used in conjunction with aqueous coating composition to adjust the viscosity of the composition as well as to provide other desirable properties. Suitable compounds include, but are not limited to, water soluble polymers and copolymers such as gum arabic, polyacrylate salts, polymethacrylate salts, polyvinyl alcohols (Elvanols from DuPont, Celvoline from Celanese), hydroxypropylenecellulose, hydroxyethylcellulose, polyvinylpyrrolidinone (such as Luvatec from BASF, Kollidon and Plasdone from ISP, and PVP-K, Glide), polyvinylether, starch, polysaccharides, polyethyleneimines with or without being derivatized with ethylene oxide and propylene oxide and the like.

Suitable rheology modifiers for organic coating compositions include fumed silica, bentonite, inorganic waxes, polyurethane waxes, and polyalkylene oxide waxes.

Where aqueous coating compositions are used, various additives for controlling or regulating the pH may also be used. Examples of suitable pH regulators include various amines such as diethanolamine and triethanolamine as well as various hydroxide reagents. A hydroxide reagent is any reagent that comprises an OH$^-$ ion, such as a salt having an hydroxide counterion. Examples include sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate OH$^-$ ions in an aqueous medium. Examples include carbonates such as sodium carbonate, bicarbonates such as sodium bicarbonate, and alkoxides such as sodium methoxide and sodium ethoxide. Buffers may also be added.

As known in the art, carbon nanotubes (CNT or CNTs plural) are carbonaceous materials that include at least one sheet of sp$^2$-hybridized carbon atoms bonded to each other to form a honey-comb lattice that forms a cylindrical or tubular structure. The carbon nanotubes can be single-walled carbon nanotubes (SWCNTs) or multi-walled carbon nanotubes (MWCNTs). SWCNTs can be thought of as an allotrope of sp$^2$-hybridized carbon similar to fullerenes. The structure is a cylindrical tube including six-membered carbon rings. Analogous MWCNTs, on the other hand, have several tubes in concentric cylinders. The number of these concentric walls may vary, e.g., from 2 to 25 or more. Typically, the diameter of MWNTs may be 10 nm or more, in comparison to 0.7 to 2.0 nm for typical SWNTs.

In many of the CNSs used in various embodiments, the CNTs are MWCNTs, having, for instance, at least two coaxial carbon nanotubes. The number of walls present, as determined, for example, by transmission electron microscopy (TEM), at a magnification sufficient for analyzing the number of wall in a particular case, can be within the range of from 2 to 30 or so, for example: 4 to 30; 6 to 30; 8 to 30; 10 to 30; 12 to 30; 14 to 30; 16 to 30; 18 to 30; 20 to 30; 22 to 30; 24 to 30; 26 to 30; 28 to 30; or 2 to 28; 4 to 28; 6 to 28; 8 to 28; 10 to 28; 12 to 28; 14 to 28; 16 to 28; 18 to 28; 20 to 28; 22 to 28; 24 to 28; 26 to 28; or 2 to 26; 4 to 26; 6 to 26; 8 to 26; 10 to 26; 12 to 26; 14 to 26; 16 to 26; 18 to 26; 20 to 26; 22 to 26; 24 to 26; or 2 to 24; 4 to 24; 6 to 24; 8 to 24; 10 to 24; 12 to 24; 14 to 24; 16 to 24; 18 to 24; 20 to 24; 22 to 24; or 2 to 22; 4 to 22; 6 to 22; 8 to 22; 10 to 22; 12 to 22; 14 to 22; 16 to 22; 18 to 22; 20 to 22; or 2 to 20; 4 to 20; 6 to 20; 8 to 20; 10 to 20; 12 to 20; 14 to 20; 16 to 20; 18 to 20; or 2 to 18; 4 to 18; 6 to 18; 8 to 18; 10 to 18; 12 to 18; 14 to 18; 16 to 18; or 2 to 16; 4 to 16; 6 to 16; 8 to 16; 10 to 16; 12 to 16; 14 to 16; or 2 to 14; 4 to 14; 6 to 14; 8 to 14; 10 to 14; 12 to 14; or 2 to 12; 4 to 12; 6 to 12; 8 to 12; 10 to 12; or 2 to 10; 4 to 10; 6 to 10; 8 to 10; or 2 to 8; 4 to 8; 6 to 8; or 2 to 6; 4 to 6; or 2 to 4.

Since a CNS is a polymeric, highly branched and crosslinked network of CNTs, at least some of the chemistry observed with individualized CNTs may also be carried out on the CNS. In addition, some of the attractive properties often associated with using CNTs also are displayed in materials that incorporate CNSs. These include, for example, electrical conductivity, attractive physical properties including maintaining or enabling good tensile strength when integrated into a silicone-based composition, thermal stability (sometimes comparable to that of diamond crystals or in-plane graphite sheets) and/or chemical stability, to name a few.

However, as used herein, the term "CNS" is not a synonym for individualized, un-entangled structures such as "monomeric" fullerenes (the term "fullerene" broadly referring to an allotrope of carbon in the form of a hollow sphere, ellipsoid, tube, e.g., a carbon nanotube, and other shapes). In fact, many embodiments of the invention highlight differences and advantages observed or anticipated with the use of CNSs as opposed to the use of their CNTs building blocks. Without wishing to be held to a particular interpretation, it is believed that the combination of branching, crosslinking, and wall sharing among the carbon nanotubes in a CNS reduces or minimizes the van der Waals forces that are often problematic when using individual carbon nanotubes in a similar manner, especially when it is desirable to prevent agglomeration.

In addition, or alternatively to performance attributes, CNTs that are part of or are derived from a CNS can be characterized by a number of features, at least some of which can be relied upon to distinguish them from other nanomaterials, such as, for instance, ordinary CNTs (namely CNTs that are not derived from CNSs and can be provided as individualized, pristine or fresh CNTs).

In many cases, a CNT present in or derived from a CNS has a typical diameter of 100 nanometers (nm) or less, such as, for example, within the range of from about 5 to about 100 nm, e.g., within the range of from about 10 to about 75, from about 10 to about 50, from about 10 to about 30, from about 10 to about 20 nm.

In specific embodiments, at least one of the CNTs has a length that is equal to or greater than 2 microns, as determined by SEM. For example, at least one of the CNTs will have a length within a range of from 2 to 2.25 microns; from 2 to 2.5 microns; from 2 to 2.75 microns; from 2 to 3.0 microns; from 2 to 3.5 microns; from 2 to 4.0 microns; or from 2.25 to 2.5 microns; from 2.25 to 2.75 microns; from 2.25 to 3 microns; from 2.25 to 3.5 microns; from 2.25 to 4 microns; or from 2.5 to 2.75 microns; from 2.5 to 3 microns; from 2.5 to 3.5 microns; from 2.5 to 4 microns; or from 3 to 3.5 microns; from 3 to 4 microns; of from 3.5 to 4 microns or higher. In some embodiments, more than one, e.g., a portion such as a fraction of at least about 0.1%, at least about 1%, at least about 10%, at least about 15%, at least about 20%, at least about 25%, at least about 30%, at least about 35%, at least about 40, at least about 45%, at least about 50% or even more than one half, of the CNTs, as determined by SEM, can have a length greater than 2 microns, e.g., within the ranges specified above.

For many CNTs in a CNS, at least a portion of a CNT sidewall is shared with another CNT. While it is generally understood that every carbon nanotube in the CNS need not necessarily be branched, crosslinked, or share common walls with other CNTs, at least a portion of the CNTs in the carbon nanostructure can be interdigitated with one another and/or with branched, crosslinked, or common-wall carbon nanotubes in the remainder of the carbon nanostructure.

The morphology of CNTs present in a CNS, in a fragment of a CNS or in a fractured CNT derived from a CNS will often be characterized by a high aspect ratio, with lengths typically more than 100 times the diameter, and in certain cases much higher. For instance, in a CNS (or CNS fragment), the length to diameter aspect ratio of CNTs can be within a range of from about 200 to about 1000, such as, for instance, from 200 to 300; from 200 to 400; from 200 to 500; from 200 to 600; from 200 to 700; from 200 to 800; from 200 to 900; or from 300 to 400; from 300 to 500; from 300 to 600; from 300 to 700; from 300 to 800; from 300 to 900; from 300 to 1000; or from 400 to 500; from 400 to 600; from 400 to 700; from 400 to 800; from 400 to 900; from 400 to 1000; or from 500 to 600; from 500 to 700; from 500 to 800; from 500 to 900; from 500 to 1000; or from 600 to 700; from 600 to 800; from 600 to 900; from 600 to 1000; from 700 to 800; from 700 to 900; from 700 to 1000; or from 800 to 900; from 800 to 1000; or from 900 to 1000.

It has been found that in CNSs, as well as in structures derived from CNSs (CNS-derived particles or material, e.g., fragments of CNSs or in fractured CNTs) at least one of the CNTs is characterized by a certain "branch density". As used herein, the term "branch" refers to a feature in which a single carbon nanotube diverges into multiple (two or more), connected multiwall carbon nanotubes. One embodiment has a branch density according to which, along a two-micrometer length of the carbon nanostructure, there are at least two branches, as determined by SEM. Three or more branches also can occur.

In addition, or in the alternative, the number of walls observed at the area (point) of branching in a CNS, fragment of CNSs or fractured CNTs differ from one side of the branching (e.g., before the branching point) to the other side of this area (e.g., after or past the branching point). Such a change in the number of walls, also referred to herein as an "asymmetry" in the number of walls, is not observed with ordinary Y-shaped CNTs (where the same number of walls is observed in both the area before and the area past the branching point).

Figure 1B:
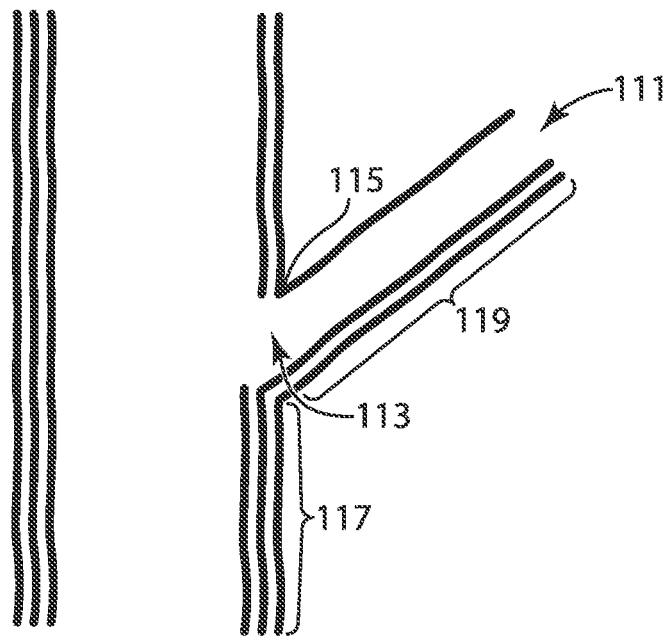

Diagrams illustrating these features are provided in FIGS. 1A and 1B. Shown in FIG. 1A, is an exemplary Y-shaped CNT 11 that is not derived from a CNS. Y-shaped CNT 11 includes catalyst particle 13 at or near branching point 15. Areas 17 and 19 are located, respectively, before and after the branching point 15. In the case of a Y-shaped CNT such as Y-shaped CNT 11, both areas 17 and 19 are characterized by the same number of walls, i.e., two walls in the drawing.

In contrast, in a CNS (FIG. 1B), a CNT building block 111, that branches at branching point 115, does not include a catalyst particle at or near this point, as seen at catalyst devoid region 113. Furthermore, the number of walls present in region 117, located before, prior (or on a first side of) branching point 115 is different from the number of walls in region 119 (which is located past, after or on the other side relative to branching point 115. In more detail, the three-walled feature found in region 117 is not carried through to region 119 (which in the diagram of FIG. 1B has only two walls), giving rise to the asymmetry mentioned above.

Figure 2A:
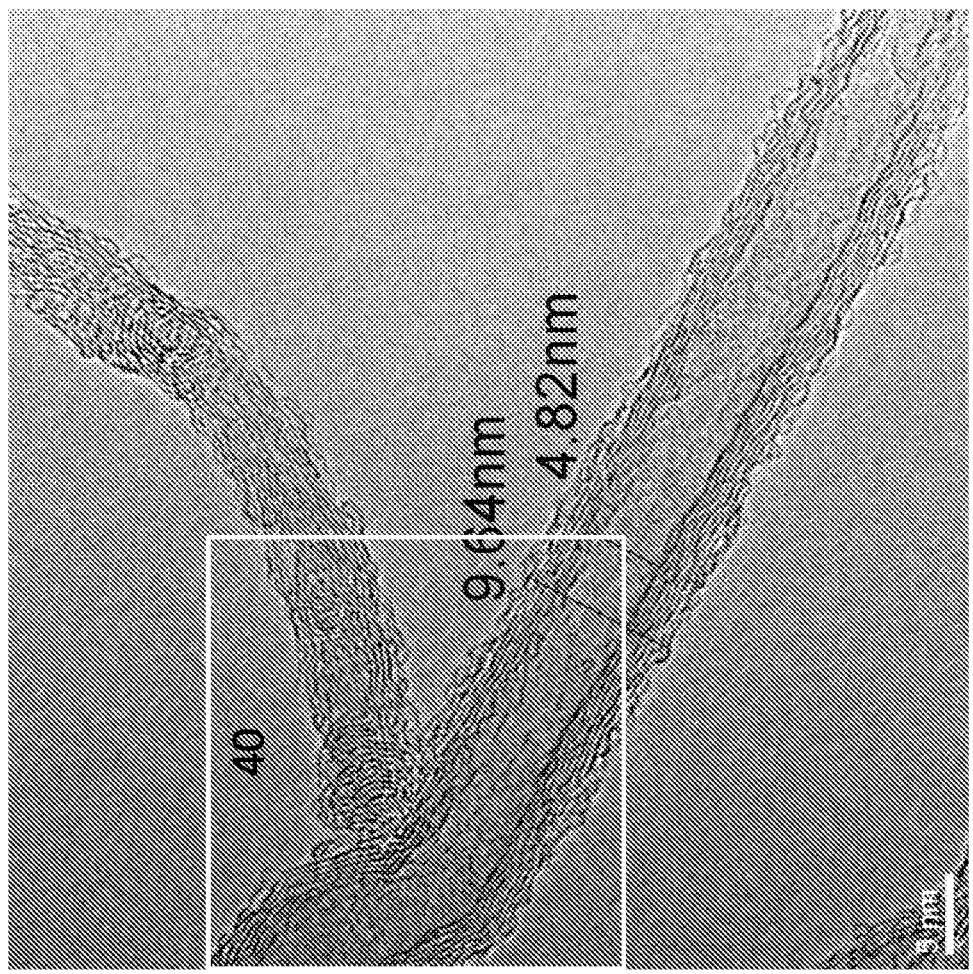
FIGS. 2A and 2B are TEM images showing features characterizing multiwall carbon nanotubes found in carbon nanostructures.
Figure 2B:
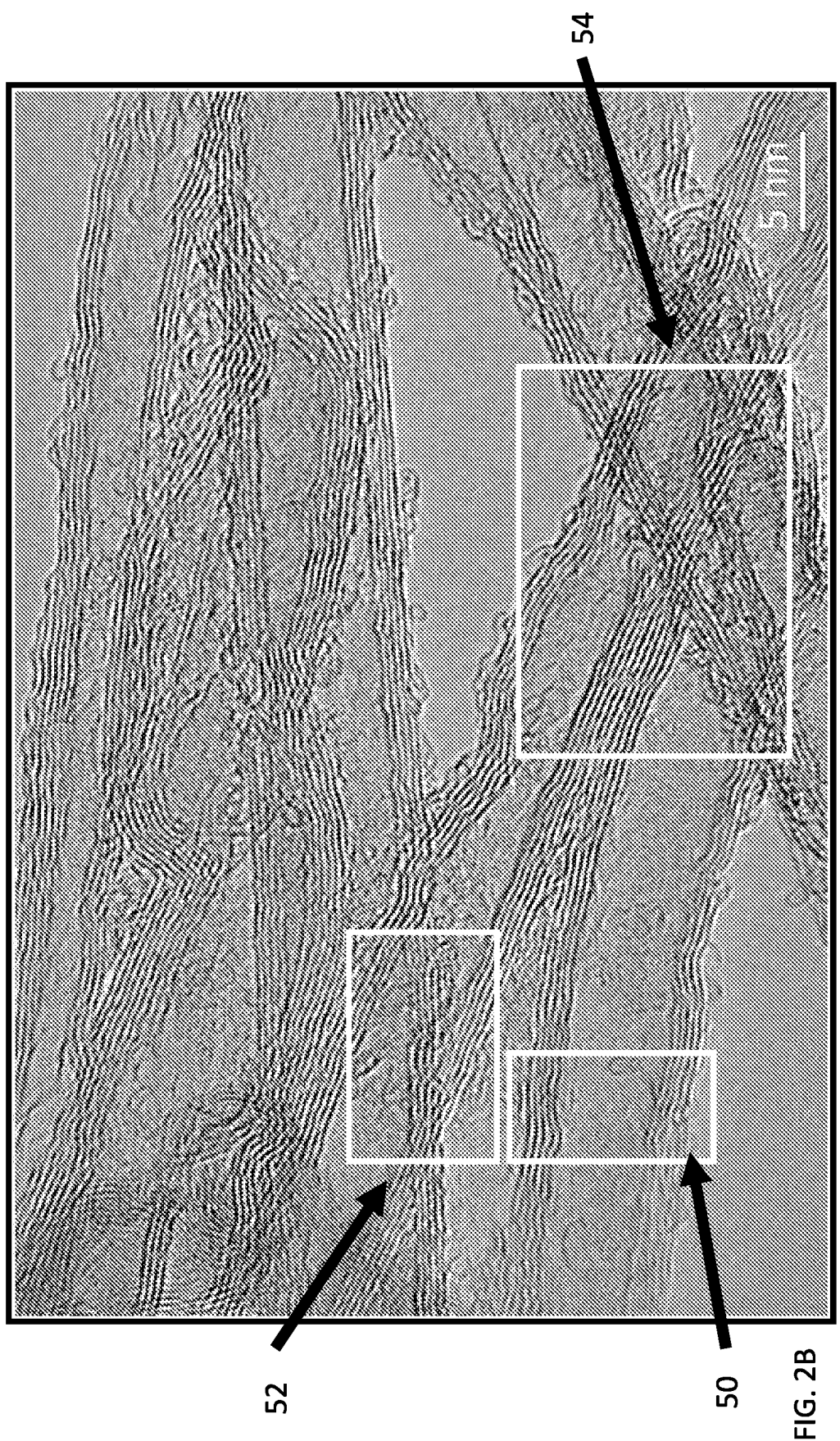

These features are highlighted in the TEM images of FIGS. 2A and 2B.

In more detail, the CNS branching in TEM region 40 of FIG. 2A shows the absence of any catalyst particle. In the TEM of FIG. 2B, first channel 50 and second channel 52 point to the asymmetry in the number of walls featured in branched CNSs, while arrow 54 points to a region displaying wall sharing.

One, more, or all these attributes can be encountered in the coating compositions described herein.

In some embodiments, the CNS is present as part of an entangled and/or interlinked network of CNSs. Such an interlinked network can contain bridges between CNSs.

Suitable techniques for preparing CNSs are described, for example, in U.S. Patent Application Publication No. 2014/0093728 A1, published on Apr. 3, 2014, U.S. Pat. Nos. 8,784,937B2; 9,005,755B2; 9,107,292B2; and 9,447,259B2. The entire contents of these documents are incorporated herein by this reference.

As described in these documents, a CNS can be grown on a suitable substrate, for example on a catalyst-treated fiber material. The product can be a fiber-containing CNS material. In some cases, the CNSs is separated from the substrate to form flakes.

As seen in US 2014/0093728A1 a carbon nanostructure obtained as a flake material (i.e., a discrete particle having finite dimensions) exists as a three-dimensional microstructure due to the entanglement and crosslinking of its highly aligned carbon nanotubes. The aligned morphology is reflective of the formation of the carbon nanotubes on a growth substrate under rapid carbon nanotube growth conditions (e.g., several microns per second, such as about 2 microns per second to about 10 microns per second), thereby inducing substantially perpendicular carbon nanotube growth from the growth substrate. Without being bound by any theory or mechanism, it is believed that the rapid rate of carbon nanotube growth on the growth substrate can contribute, at least in part, to the complex structural morphology of the carbon nanostructure. In addition, the bulk density of the CNS can be modulated to some degree by adjusting the carbon nanostructure growth conditions, including, for example, by changing the concentration of transition metal nanoparticle catalyst particles that are disposed on the growth substrate to initiate carbon nanotube growth.

The flakes can be further processed, e.g., by cutting or fluffing (operations that can involve mechanical ball milling, grinding, blending, etc.), chemical processes, or any combination thereof.

In some embodiments, the CNSs employed are "coated", also referred to herein as "sized" or "encapsulated" CNSs. In a typical sizing process, the coating is applied onto the CNTs that form the CNS. The sizing process can form a partial or a complete coating that is non-covalently bonded to the CNTs and, in some cases, can act as a binder. In addition, or in the alternative, the size can be applied to already formed CNSs in a post-coating (or encapsulation) process. With sizes that have binding properties, CNSs can be formed into larger structures, granules or pellets, for example. In other embodiments the granules or pellets are formed independently of the function of the sizing.

Coating amounts can vary. For instance, relative to the overall weight of the coated CNS material, the coating can be within the range of from about 0.1 weight % to about 10 weight % (e.g., within the range, by weight, of from about 0.1% to about 0.5%; from about 0.5% to about 1%; from about 1% to about 1.5%; from about 1.5% to about 2%; from about 2% to about 2.5%; from about 2.5% to about 3%; from about 3% to about 3.5%; from about 3.5% to about 4%; from about 4% to about 4.5%; from about 4.5% to about 5%; from about 5% to about 5.5%; from about 5.5% to about 6%; from about 6% to about 6.5%; from about 6.5% to about 7%; from about 7% to about 7.5%; from about 7.5% to about 8%; from about 8% to about 8.5%; from about 8.5% to about 9%; from about 9% to about 9.5%; or from about 9.5% to about 10%.

In many cases, controlling the amount of coating (or sizing) reduces or minimizes undesirable effects on the properties of the CNS material itself. Low coating levels, for instance, are more likely to preserve electrical properties brought about by the incorporation of CNSs or CNS-derived (e.g., CNS fragments of fractured CNTs) materials in a coating composition.

Various types of coatings can be selected. In many cases, sizing solutions commonly used in coating carbon fibers or glass fibers could also be utilized to coat CNSs. Specific examples of coating materials include but are not limited to fluorinated polymers such as poly(vinyldifluoroethylene) (PVDF), poly(vinyldifluoroethylene-co-hexafluoropropylene) (PVDF-HFP), poly(tetrafluoroethylene) (PTFE), polyimides, and water-soluble binders, such as poly(ethylene) oxide, polyvinyl-alcohol (PVA), cellulose, carboxymethylcellulose (CMC), starch, hydroxypropylcellulose, regenerated cellulose, polyvinyl pyrrolidone (PVP), and copolymers and mixtures thereof. In many implementations, the CNSs used are treated with a polyurethane (PU), a thermoplastic polyurethane (TPU), or with polyethylene glycol (PEG).

Polymers such as, for instance, epoxy, polyester, vinylester, polyetherimide, polyetherketoneketone, polyphthalamide, polyetherketone, polyetheretherketone, polyimide, phenol-formaldehyde, bismaleimide, acrylonitrile-butadiene styrene (ABS), polycarbonate, polyethyleneimine, polyurethane, polyvinyl chloride, polystyrene, polyolefins, polypropylenes, polyethylenes, polytetrafluoroethylene, elastomers such as, for example, polyisoprene, polybutadiene, butyl rubber, nitrile rubber, ethylene-vinyl acetate polymers, silicone polymers, and fluorosilicone polymers, combinations thereof, or other polymers or polymeric blends can also be used in some cases. In order to enhance electrical conductivity, conductive polymers such as, for instance, polyanilines, polypyrroles and polythiophenes can also be used.

Some implementations utilize coating materials that can assist in stabilizing a CNS dispersion in a solvent. In one example, the coating is selected to facilitate and/or stabilize dispersing CNSs in a vehicle produced by combining the desired resin for the coating with a desired solvent together with optional dispersant. Any suitable combination of the resins and solvents provided above may be employed. In another example, the coating material is the same as, similar to, or compatible with a dispersant or thickener employed when processing CNSs.

Many embodiments described herein use CNS-materials that have a 97% or higher CNT purity. Often, the CNSs used herein require no further additives to counteract Van der Waals forces.

CNSs can be provided in the form of a loose particulate material (as CNS flakes, granules, pellets, etc., for example) or in formulations that also include a liquid medium, e.g., dispersions, slurries, pastes, or in other forms. In many implementations, the CNSs employed are separated from their growth substrate.

Figure 3A:
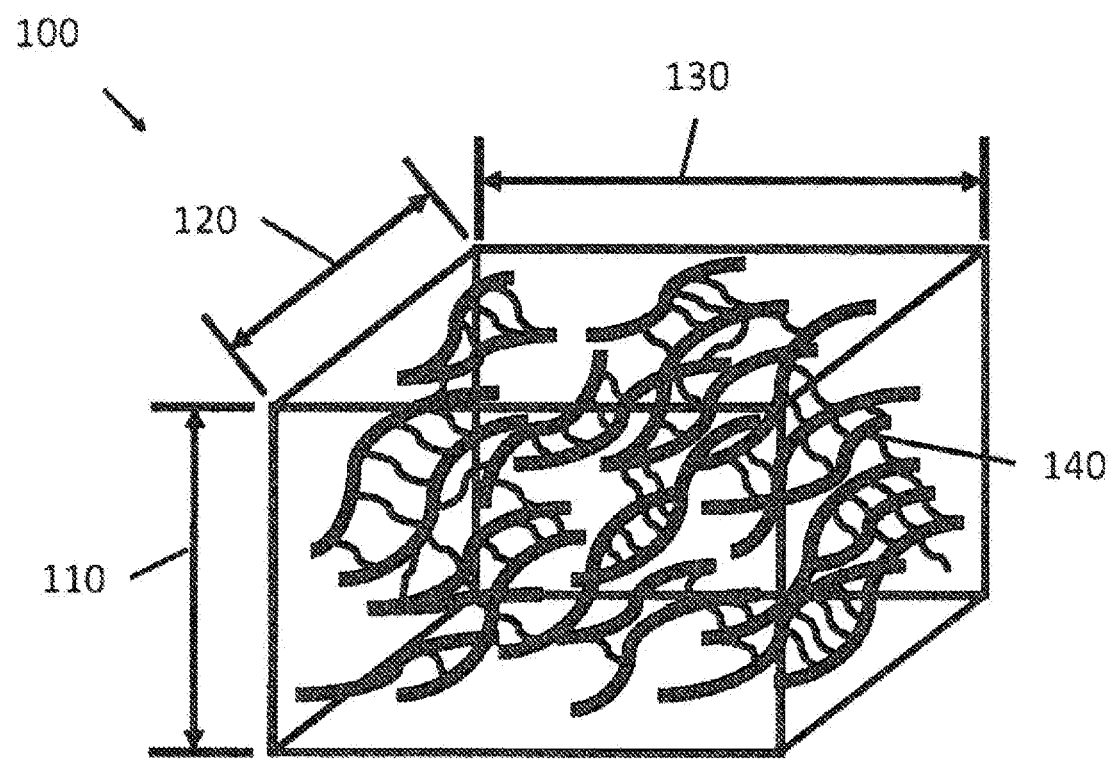
FIG. 3A is an illustrative depiction of a carbon nanostructure flake material after isolation of the carbon nanostructure from a growth substrate.

In some embodiments, the CNSs are provided in the form of a flake material after being removed from the growth substrate upon which the carbon nanostructures are initially formed. As used herein, the term "flake material" refers to a discrete particle having finite dimensions. Shown in FIG. 3A, for instance, is an illustrative depiction of a CNS flake material after isolation of the CNS from a growth substrate. Flake structure 100 can have first dimension 110 that is in a range from about 1 nm to about 35 microns thick, particularly about 1 nm to about 500 nm thick, including any value in between and any fraction thereof. Flake structure 100 can have second dimension 120 that is in a range from about 1 micron to about 750 microns tall, including any value in between and any fraction thereof. Flake structure 100 can have third dimension 130 that can be in a range from about 1 micron to about 750 microns, including any value in between and any fraction thereof. Two or all of dimensions 110, 120 and 130 can be the same or different.

For example, in some embodiments, second dimension 120 and third dimension 130 can be, independently, on the order of about 1 micron to about 10 microns, or about 10 microns to about 100 microns, or about 100 microns to about 250 microns, from about 250 to about 500 microns, or from about 500 microns to about 750 microns.

CNTs within the CNS can vary in length from about 10 nanometers (nm) to about 750 microns (μm), or higher. Thus, the CNTs can be from 10 nm to 100 nm, from 10 nm to 500 nm; from 10 nm to 750 nm; from 10 nm to 1 micron; from 10 nm to 1.25 micron; from 10 nm to 1.5 micron; from 10 nm to 1.75 micron; from 10 nm to 2 micron; or from 100 nm to 500 nm, from 100 nm to 750 nm; from 100 nm to 1 micron; from 100 to 1.25 micron; from 100 to 1.5 micron; from 100 to 1.75 micron from 100 to 2 microns; from 500 nm to 750 nm; from 500 nm to 1 micron; from 500 nm to 1 micron; from 500 nm to 1.25 micron; from 500 nm to 1.5 micron; from 500 nm to 1.75 micron; from 500 nm to 2 micron; from 750 nm to 1 micron; from 750 nm to 1.25 micron; from 750 nm to 1.5 micron; from 750 nm to 1.75 microns; from 750 nm to 2 microns; from 1 micron to 1.25 micron; from 1.0 micron to 1.5 micron; from 1 micron to 1.75 micron; from 1 micron to 2 microns; or from 1.25 micron to 1.5 micron; from 1.25 micron to 1.75 micron; from 1 micron to 2 microns; or from 1.5 to 1.75 micron; from 1.5 to 2 micron; or from 1.75 to 2 microns. In some embodiments, at least one of the CNTs has a length that is equal to or greater than 2 microns, as determined by SEM, for example, up to 4 microns or greater.

Figure 3B:
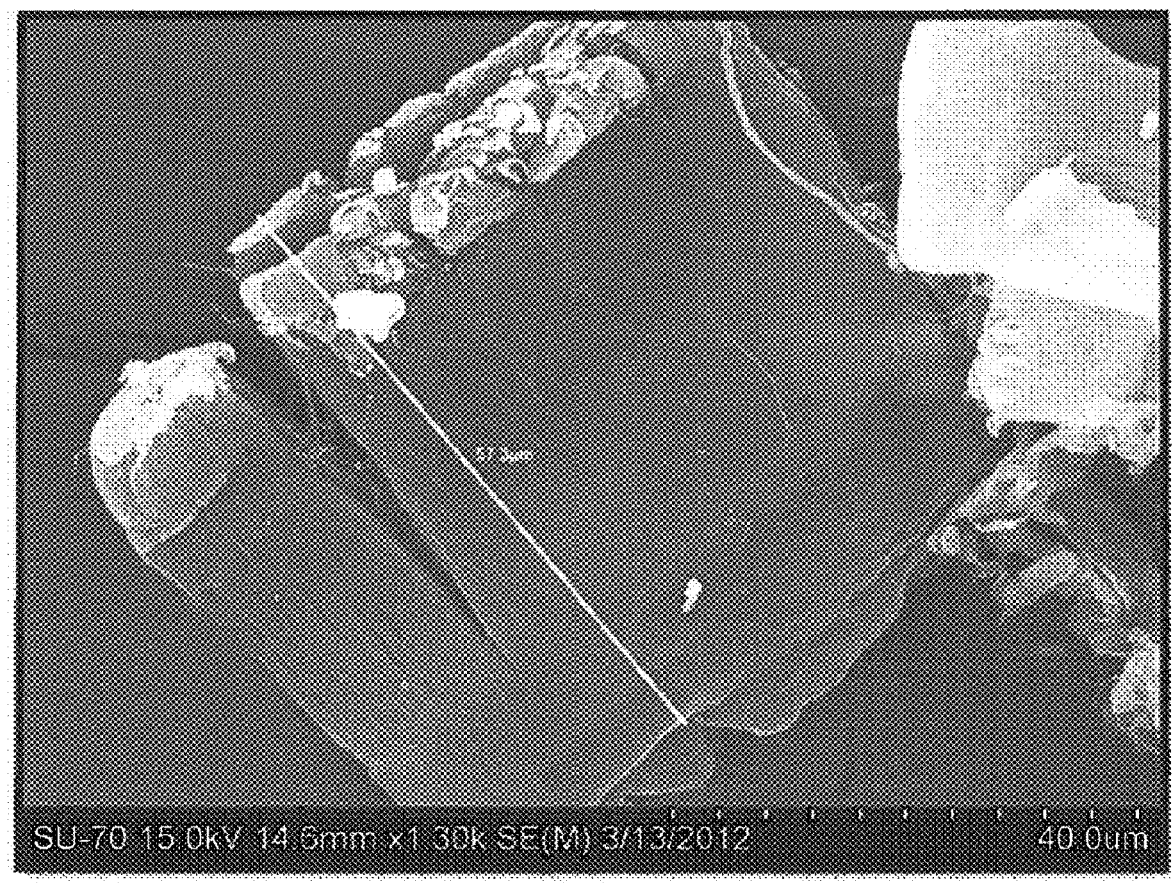
FIG. 3B is a SEM image of an illustrative carbon nanostructure obtained as a flake material.

Shown in FIG. 3B is a SEM image of an illustrative carbon nanostructure obtained as a flake material. The carbon nanostructure shown in FIG. 3B exists as a three-dimensional microstructure due to the entanglement and crosslinking of its highly aligned carbon nanotubes. The aligned morphology is reflective of the formation of the carbon nanotubes on a growth substrate under rapid carbon nanotube growth conditions (e.g., several microns per second, such as about 2 microns per second to about 10 microns per second), thereby inducing substantially perpendicular carbon nanotube growth from the growth substrate. Without being bound by any theory or mechanism, it is believed that the rapid rate of carbon nanotube growth on the growth substrate can contribute, at least in part, to the complex structural morphology of the carbon nanostructure. In addition, the bulk density of the carbon nanostructure can be modulated to some degree by adjusting the carbon nanostructure growth conditions, including, for example, by changing the concentration of transition metal nanoparticle catalyst particles that are disposed on the growth substrate to initiate carbon nanotube growth.

A flake structure can include a webbed network of carbon nanotubes in the form of a carbon nanotube polymer (i.e., a "carbon nanopolymer") having a molecular weight in a range from about 15,000 g/mol to about 150,000 g/mol, including all values in between and any fraction thereof. In some cases, the upper end of the molecular weight range can be even higher, including about 200,000 g/mol, about 500,000 g/mol, or about 1,000,000 g/mol. The higher molecular weights can be associated with carbon nanostructures that are dimensionally long. The molecular weight can also be a function of the predominant carbon nanotube diameter and number of carbon nanotube walls present within the carbon nanostructure. The crosslinking density of the carbon nanostructure can range between about 2 mol/cm$^3$ to about 80 mol/cm$^3$. Typically, the crosslinking density is a function of the carbon nanostructure growth density on the surface of the growth substrate, the carbon nanostructure growth conditions and so forth. It should be noted that the typical CNS structure, containing many, many CNTs held in an open web-like arrangement, removes Van der Waals forces or diminishes their effect. This structure can be exfoliated more easily, which makes many additional steps of separating them or breaking them into branched structures unique and different from ordinary CNTs.

With a web-like morphology, carbon nanostructures can have relatively low bulk densities, for example, from about 0.005 g/cm$^3$ to about 0.1 g/cm$^3$ or from about 0.01 g/cm$^3$ to about 0.05 g/cm$^3$. As-produced carbon nanostructures can have an initial bulk density ranging from about 0.003 g/cm$^3$ to about 0.015 g/cm$^3$. Further consolidation and/or coating to produce a carbon nanostructure flake material or like morphology can raise the bulk density to a range from about 0.1 g/cm$^3$ to about 0.15 g/cm$^3$. In some embodiments, optional further modification of the carbon nanostructure can be conducted to further alter the bulk density and/or another property of the carbon nanostructure. In some embodiments, the bulk density of the carbon nanostructure can be further modified by forming a coating on the carbon nanotubes of the carbon nanostructure and/or infiltrating the interior of the carbon nanostructure with various materials. Coating the carbon nanotubes and/or infiltrating the interior of the carbon nanostructure can further tailor the properties of the carbon nanostructure for use in various applications. Moreover, forming a coating on the carbon nanotubes can desirably facilitate the handling of the carbon nanostructure. Further compaction can raise the bulk density to an upper limit of about 1 g/cm$^3$, with chemical modifications to the carbon nanostructure raising the bulk density to an upper limit of about 1.2 g/cm$^3$.

In addition to the flakes described above, the CNS material can be provided as granules, pellets, or in other forms of loose particulate material, having a typical particle size within the range of from about 1 mm to about 1 cm, for example, from about 0.5 mm to about 1 mm, from about 1 mm to about 2 mm, from about 2 mm to about 3 mm, from about 3 mm to about 4 mm, from about 4 mm to about 5 mm, from about 5 mm to about 6 mm, from about 6 mm to about 7 mm, from about 7 mm to about 8 mm, from about 8 mm to about 9 mm or from about 9 mm to about 10 mm.

Commercially, examples of CNS materials that can be utilized are those developed by Applied Nanostructured Solutions, LLC (ANS) (Massachusetts, United States).

In some implementations, CNSs are provided in the presence of a liquid medium. The liquid medium can be any liquid, a solvent, for instance, that is suitable for use with the constituents of the coating compositions. For example, the liquid medium may be the same as the solvent or resin of the vehicle or may be the same as an optional component such as a co-solvent. Alternatively or in addition, the liquid medium may be miscible or soluble in the solvent or resin of the vehicle. Unlike solutions or dispersions that employ ordinary, individualized CNTs, e.g., in pristine form, CNSs, in particular when provided as post-coated CNSs in the form of granules or pellets, can yield stable dispersions. In some embodiments, stable dispersions can be achieved in the absence of stabilizing surfactants, even in aqueous vehicles. The CNS material can be combined with the liquid, optionally in the presence of a dispersant, by a suitable mixing technique, using, for example, conventional mixing equipment. In specific embodiments, the constituents are blended to form a composition, a solution or dispersion, for example. The composition can be characterized, for instance, by a concentration of CNS in the solvent up to about 0.5 wt %, for example, from 0.1 wt % to 0.4 wt % or from 0.2 wt % to 0.3 wt %. Alternatively or in addition, higher loadings, for example, up to about 1 wt %, may be employed.

Unlike ordinary solutions or dispersions that use ordinary, individualized CNTs, e.g., in pristine form, CNSs, in particular when provided as post-coated CNSs in the form of granules or pellets, can yield stable dispersions. In some embodiments, stable dispersions can be achieved in the absence of stabilizing surfactants, even with water as solvent. Other embodiments utilize a solvent in combination with water during wet processing. Examples of solvents that can be used include, but are not limited to, isopropanol (IPA), ethanol, methanol, and water.

In some cases, techniques used to prepare the dispersion generate CNS-derived species or material such as "CNS fragments" and/or "fractured CNTs" that become distributed (e.g., homogeneously) in individualized form throughout the dispersion. Except for their reduced sizes, CNS fragments (a term that also includes partially fragmented CNSs) generally share the properties of intact CNS and can be identified by electron microscopy and other techniques, as described above. Fractured CNTs can be formed when crosslinks between CNTs within the CNS are broken, under applied shear, for example. Derived (generated or prepared) from CNSs, fractured CNTs are branched and share common walls with one another.

In other embodiments, pellets, granules, flakes or other forms of loose CNS particles are first dispersed in a liquid medium, generating CNS fragments (including partially fragmented CNSs) and/or fractured CNTs. The dispersion can be prepared from a starting material such as, for example, uncoated, PU- or PEG-coated CNS, or CNSs having any other polymeric binder coating.

In some situations, an initial CNS is broken into smaller CNS units or fragments. Except for their reduced sizes, these fragments generally share the properties of intact CNS and can be identified by electron microscopy and other techniques, as described above.

Also possible are changes in the initial nanostructure morphology of the CNS. For example, applied shear can break crosslinks between CNTs within a CNS to form CNTs that typically will be dispersed as individual CNTs in the electrode composition. It is found that structural features of branching and shared walls are retained for many of these CNTs, even after the crosslinks are removed. CNTs that are derived (prepared) from CNSs and retain structural features of CNT branching and shared walls are referred to herein as "fractured" CNTs. These species are capable of imparting improved interconnectivity (between CNT units), resulting in better conductivity at lower concentrations.

Thus, in comparison to coating compositions that employ ordinary, individualized CNTs, e.g., in pristine form, coating compositions described herein will often include fractured CNTs. These fractured CNTs can readily be differentiated from ordinary carbon nanotubes through standard carbon nanotube analytical techniques, such as SEM, for example. It is further noted that not every CNT encountered needs to be branched and share common walls; rather it is a plurality of fractured CNTs, that, as a whole, will possess these features.

The CNSs used herein can be identified and/or characterized by various techniques. Electron microscopy, including techniques such as transmission electron microscopy (TEM) and scanning electron microscopy (SEM), for example, can provide information about features such as the frequency of specific number of walls present, branching, the absence of catalyst particles, etc. See, e.g., FIGS. 2A-2D.

Raman spectroscopy can point to bands associated with impurities. For example, a D-band (around 1350 $cm^{-1}$) is associated with amorphous carbon; a G band (around 1580 $cm^{-1}$) is associated with crystalline graphite or CNTs). A G' band (around 2700 $cm^{-1}$) is expected to occur at about 2× the frequency of the D band. In some cases, it may be possible to discriminate between CNS and CNT structures by thermogravimetric analysis (TGA).

Coating compositions may be prepared using any technique known to those of skill in the art. For example, CNSs may be combined with a liquid vehicle and other coating components in a high speed mixer/dissolver, blender or mill, for example, a vertical sand mill, horizontal sand mill, or bucket sand mill, or other suitable apparatus known to those of skill in the art. Alternatively or in addition, CNSs may be combined with an aqueous or non-aqueous solvent to form a millbase and then let down with resin and optional additional solvent to form a curable coating composition. The optional additives may be part of the millbase or may be added to the composition during the letdown step. The amount of CNSs used may be adjusted to optimize such properties as tint, viscosity, and resistivity.

To evaluate the use of coating compositions in forming coatings, the following procedure, referred to herein as "Evaluation Method A," can be used to produce a film that can then be tested for resistivity. The coating composition being tested is applied to a white drawdown chart with a 4 mil (101.6 μm) drawdown bar, air-dried for 1 hour, and then cured to remove the solvent and produce a cured coating. The appropriate curing temperature and time will be apparent to those of skill in the art and will result in complete removal of any solvent from the coating. For aqueous solvents, a typical curing method is curing for 1 hour at 80° C. For organic solvents, a typical curing method is curing for 1 hour at 138° C. Alternatively or in addition, the following procedure, referred to herein as "Evaluation Method B," can be used to produce a film that can then be tested for both resistivity and transparency. The coating composition being tested is applied to a transparent polyethylene terephthalate substrate with a 12 micron drawdown wire, air dried for one hour, and then cured to remove the solvent and produce a cured coating. The appropriate curing temperature and time will be apparent to those of skill in the art and will result in complete removal of any solvent from the coating. For aqueous solvents, a typical curing method is curing for 0.5 hour at 80° C. For organic solvents, a typical curing method is curing for 0.5 hour at 140° C.

Several measurable optical factors can be used to evaluate primer coatings comprising CNS. The color can be represented three dimensionally by measuring jetness (L*), blue/yellow (b*) and red/green (a*). An L* value of 0 would be perfectly black, while higher numbers are whiter. These values can be measured in a laboratory using instrumentation such as a Hunter Lab Scan 6000. In certain embodiments, curable coating compositions, after preparation of a coating according to Evaluation Method A, result in a coating having an L* value of at least 30, for example, at least 40, at least 55, at least 60 or at least 70. L* may be increased by increasing the amount of white pigment, e.g., titania, in the coating formulation. For example, the coating composition may have from 20-30 wt % titania on a dry basis. Such pigments may increase the L* value to at least 55, for example, at least 70, at least 80, or at least 90. Alternatively or in addition, curable coating compositions, after preparation of a coating according to Evaluation Method B, result in a coating having transparency greater than 55% and resistivity (ohm/sq) satisfying $\log_{10}$(surface resistivity)≤0.005(transparency)$^2$−0.52(transparency)+19, where transparency is given as a percent.

The coatings provided herein may have low resistivity. The use of CNS provides high conductivity at low loadings, allowing a primer coating or basecoat to exhibit extremely low jetness or high transparency. Low jetness facilitates color coatings with lighter colors such as white or yellow which may not hide a darker primer at typical thicknesses such as 8-15 microns. High transparency allows the formation of conductive coatings on substrates that are designed to allow light transmission, such as optical displays and packaging. The coatings provided herein may achieve surface resistivities of less than $10^7$ ohm/square, for example, less than $4\times10^6$ or less than $2.5\times10^6$ ohm/square but may sacrifice some transparency to do so. Surface resistivity may be as low as $10^5$ ohm/square. Lower resistivities, e.g., as low as $10^4$ or $10^3$ ohm/square, may be achieved but may result in darker (i.e., lower L*) or less transparent coatings. Thinner coatings, e.g. 1 mil (25.4 microns) or less, may achieve a surface resistivity of at most $5\times10^{10}$ ohm/sq, for example at most $5\times10^9$ ohm/sq, at most $5\times10^8$ ohm/sq, while still maintaining a transparency of at least 55%, preferably 60 or 70%, more preferably at least 80%, for example, from 55% to 80% or from 60% to 90%.

The low resistivity of CNS-loaded coatings also facilitates downstream coating processes. For example, the conductive surface provided by a CNS-loaded coating facilitates electrostatic painting of otherwise non-conductive materials such as plastics. Electrostatic painting is used to coat a grounded surface with charged paint particles from a specialized gun. A CNS-loaded coating can provide a conductive surface that can be grounded to even non-conductive substrates.

Alternatively or in addition, a conductive CNS-loaded coating can facilitate electroplating of non-conductive substrates. For example, a plastic workpiece can be coated with an CNS-loaded primer coating and immersed in an appropriate plating bath. Application of a current causes a thin layer of metal to be deposited on the workpiece. The metal can be patterned by controlling where the CNS-loaded primer is applied. For example, standard photolithography techniques may be employed to deposit the CNS-loaded primer in desired locations on a non-conductive substrate. In one embodiment, a workpiece is coated with a photoresist and patterned with appropriate radiation. The CNS-loaded primer is coated onto the workpiece. Washing the workpiece with an appropriate solvent will remove those sections of the photoresist that were not exposed to radiation, washing those sections of the primer coating away as well. Since the substrate is not conductive, only those sections of the surface coated with the CNS-loaded primer can be electroplated. Other methods of patterning coatings known to those of skill in the art may also be employed.

Alternatively or in addition, the CNS-loaded coating can contribute to electromagnetic shielding. Many automobile components are formulated to provide EMI shielding for electronic components from external radio signals. While older automobiles with metal bodies performed this function automatically, lightweighting trends in automobile manufacturing have let many of these metal parts to be replaced by plastic. Moreover, the increased use of electronics and powered components in vehicles, such as keyless ignitions, remote starters, automatic sliding doors, and powered seat controls and windows generates increasing amounts of electromagnetic emissions. Meanwhile, vehicles continue to have incorporate more electronic systems such as GPS navigation systems, entertainment systems, Bluetooth compatible devices, hands-free control of cabin features ranging from navigation to entertainment systems, and touchscreen controlled systems that both generate and are susceptible to electromagnetic interference ("EMI"). CNS-loaded primer coatings provide an additional tool to automobile and component designers that can augment the EMI shielding capabilities of the coated parts.

Alternatively or in addition, the CNS-loaded coating can contribute to electrostatic dissipation. Anti-static coatings on protective films for displays on televisions and smart phones and on packaging trays, carrier tapes, masking films, and cover tapes for electrical components can all benefit from a combination of transparency and low resistivity. Such coatings may also be applied to workbenches or floors to provide electrostatic dissipation.

The present invention will be further clarified by the following examples which are intended to be only exemplary in nature.

EXAMPLES

Example 1-9

A series of millbases was prepared using several carbon blacks as listed in Table 1 below, and carbon nanostructures coated with polyethylene glycol (Applied Nanostructured Materials, Billerica, Massachusetts), MWCNT (IM299CP, 5-15 nm in diameter, less than 50 μm in length, >99% purity, <1% ash, surface area of 280-350 m$^2$/g, Chengdu Organic Chemical Co. Ltd. Chinese Academy of Sciences), and TUBALL PD SWCNT from OCSiAl (Luxembourg, Luxembourg), a dispersion of 0.4 wt % SWCNT and 0.6 wt % carboxymethylcellulose in water.

TABLE 1

| Product | N$_2$SA (m$^2$/g) | OAN(g/100 g) |
| --- | --- | --- |
| VULCAN ® XCmax ™ 22 | 1461 | 337 |
| Printex ® XE2B | 1003 | 428 |

Millbases were prepared with each of these pigments according to the formulations in Table 2 below. Deionized water, BYK-024 defoamer, and dispersant were charged to a plastic tubby and stirred at 1500 rpm for 15 min. While maintaining stirring, the pigment was added, following which the stir rate was increased to 2000 rpm and the mixture stirred an additional 15 min. For the millbases of Examples 1-7 and 8A, 50 g of the mixture was charged with 75 g ZrO beads (1 mm diameter), mixed on a LAU DAS200 disperser for one hour, and filtered. In Example 8B, 50 g of the mixture was charged with 70 mL 1 mm diameter ZrO beads and ground in an Eiger mill for 3 hours at 2800 rpm. Fineness of grind was evaluated using a Hegman grindometer. Viscosity of the millbase was tested in a Brookfield DVII+ viscometer at room temperature, and the particle size distribution was measured on a HORIBA LA-950V2 particle size instrument from Horiba.

content in the dry coating was about 4.57 wt % and the titania content about 27.4% on a dry film basis. For coatings with CNS, the CNS content in the dry coating was about 0.24 wt % and the titania content about 29.4%.

TABLE 3

| Let down recipe | | |
| --- | --- | --- |
| Name | Component | Weight (%) |
| Neocryl ® XK-101 | Resin | 60.00 |
| BYK ®-024 | Defoamer | 0.20 |
| Surfynol ® 104DPM | Surfactant | 0.20 |
| Disperbyk ®-346 | Surfactant | 0.40 |
| Dipropylene n-Butyl Ether | Co-solvent | 3.00 |
| AMP95 ™ | Co-solvent | 0.30 |
| Deionized water | Water | 0.60 |
| Rheolate ® 299 | Rheology Modifier | 0.30 |

TABLE 2

| Component | Comparative 1 | Comparative 2 | Comparative 3 | Comparative 4 | Comparative 5 |
| --- | --- | --- | --- | --- | --- |
| Pigment/amount (wt %) | 10% VULCAN ® XCmax 22 | 10% VULCAN ® XCmax 22 | 10% Printex ® XE2B | 10% Printex ® XE2B | 8% Printex ® XE2B |
| Dispersant/Amount with respect to pigment (wt %) | Solsperse WV400 (50%) | CMC* (50%) + Solsperse WV400 (50%) | Solsperse WV400 (80%) | Solsperse 46000 (100%) | Solsperse 46000 (127%) |
| Defoamer | 0.2 wt % | 0.2 wt % | 0.2 wt % | 0.2 wt % | 0.2 wt % |
| DI water | Balance | Balance | Balance | Balance | Balance |

| Component | Example 6 | Comparative 7 | Example 8 | Comparative 9 |
| --- | --- | --- | --- | --- |
| Pigment/amount (wt %) | CNS | MWCNT | CNS | SWCNT* |
| DI Water (wt %) | 98.47 | 98.47 | 98.60 | Balance |
| Dispersant (wt % in formulation) | TexCare SRN 260 (60% solids) 0.83 | TexCare SRN 260 (60% solids) 0.83 | Dispersogen ® TC130 (0.4%) + TC93 (0.2%) | Carboxymethyl cellulose (0.6%) |
| Defoamer (wt %) | 0.2% | 0.2% | 0.2% | — |
| Pigment amount | 0.50% | 0.50% | 0.4% | 0.4% |

*CMC = carboxymethyl cellulose
TexCare and Dispersogen dispersants from Clariant GmbH
*Formulation as received from manufacturer A white millbase was prepared in the same manner with 31 wt % deionized water, 60 wt % Ti-Pure® R960 titania, 1% AMP95 co-dispersant, 6 wt % DisperBYK-90 dispersing agent, and 2 wt % Dehydran® 1293 defoamer. Acrylic coating formulations were prepared by combining the white millbase with the pigmented millbases in letdown formulations. The components listed in Table 3 were charged into a Dispermat CV-SIP operated at 2000 rpm in the following sequence: resin, water, pigmented millbase, white millbase followed by the remaining components, with the dipropylene-n-butyl ether co-solvent last. The formulation was stirred for ten minutes. Films were prepared on BYK-O-CHART panels using a 4 mil (101.6 micron) drawdown bar, air-dried for 1 hour, and then cured at 80° C. for an hour. For coatings pigmented with carbon black, the carbon black TABLE 3-continued

| Let down recipe | | |
| --- | --- | --- |
| Name | Component | Weight (%) |
| Millbase (10% CB based or 0.5% CNS based) | Pigment | 17.50 |
| TiO2 dispersion (60%) | Pigment | 17.50 |
| Total | | 100.00 |

Neocryl resin from DSM Coating Resins
Surfynol surfactant from Evonik Industries
Disperbyk dispersant from BYK Chemie
Rheolate rheology modifier from Elementis Specialties
AMP95 cosolvent from Angus Chemical Company Surface resistivity was measured using a Keithley model 6517B electrometer fitted with Keithley 8009 test fixtures. Color measurements were performed on an X-Rite SP64, hand-held spectrophotometer in the CIE L*a*b* colorimetric system while excluding the specular reflectance mode. The results are in Table 4 below.

TABLE 4

| Example | Viscosity (cP) 10/50/100 rpm | Hegman Fineness | PSD (μm) D50/D90 | | L* | Surface resistivity (ohm/square) |
|---|---|---|---|---|---|---|
| 1* | 39.7/35.2/33.7 | 10 | 0.62 | 1.74 | 20.84 | 4.00E+08 |
| 2* | 3222/1094/717 | 15 | 0.32 | 2.34 | 21.11 | 1.40E+09 |
| 3* | 108/111/114 | 15 | 2.53 | 5.66 | 26.95 | 2.50E+06 |
| 4* | 108/79/74 | 12.5 | 2.57 | 5.59 | 27.61 | 1.20E+08 |
| 5* | 41/40/38 | 7.5 | 2.45 | 9.86 | 27.77 | 2.60E+08 |
| 6 | <200 | 40 | 21.8 | 114.8 | 64.19 | 8.00E+06 |
| 7* | 30/25/23 | 7.5 | 4.9 | 9.9 | 63.37 | 4.20E+13 |
| 8A | 2370/793/526 | 20 | 10.00 | 18.09 | 60.73 | 3.50E+06 |
| 8B | 2900/899/538 | 20 | 6.07 | 10.57 | 59.43 | 1.70E+06 |
| 9* | 7500/2300/EEEE | 40 | 2.49 | 5.1 | 66.71 | 6.00E+07 |

*Comparative Example

Figure 4:
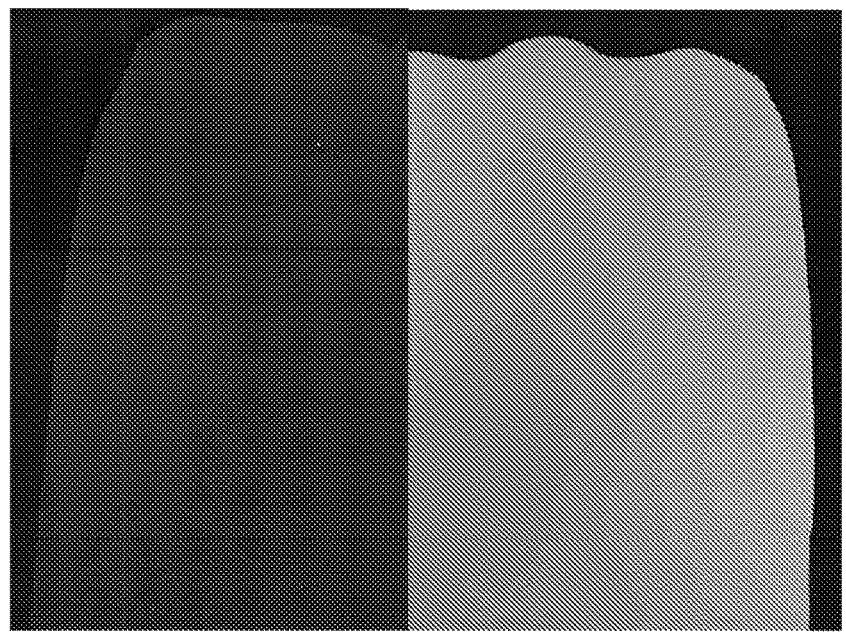
FIG. 4 is a photograph of two coatings prepared with 4.5 wt % carbon black (left) and 0.25 wt % CNS (right).

The data show that, for the carbon blacks, adjusting the formulation is a tool to adjust resistivity at constant filler loading. However, the use of CNSs at far lower loadings achieves similar conductivity while providing much lighter color. This is easily observed in FIG. 4, which shows coatings produced with the coating formulations of Comparative Example 3 (left) and Example 6 (right). CNTs are unable to match the electrical performance provided by CNSs, even though CNTs provide improved color performance (higher L*) with respect to carbon black.

Example 10

A series of millbases was prepared using carbon nanostructures coated with polyethylene glycol (Applied Nanostructured Materials, Billerica, Massachusetts), MWCNT (CNTs5, Cabot Performance Materials, Zhuhai, China), and SWCNT (Tuball CNT from OCSiAl).

Millbases (approx. 300 g) were prepared with 0.4 wt % of each of these pigments according to the following formulation: Deionized water (98.8 wt %), BYK-024 defoamer (0.2 wt %), and dispersant (0.4 wt % Dispersogen TC130 dispersant and 0.2 wt % Dispersogen TC93 dispersant, both from Clariant GmbH) were charged to a plastic tubby and stirred at 1500 rpm for 15 min. While maintaining stirring, the pigment was added, following which the stir rate was increased to 2000 rpm and the mixture stirred an additional 15 min. 300 g of the mixture was charged with 70 mL ZrO beads (1 mm diameter), mixed on a Netzsch Minifer instrument for six hours at 2800 rpm, and filtered. Fineness of grind was evaluated using a Hegman grindometer. Viscosity of the millbase was tested in a Brookfield DVII+ viscometer at room temperature and 10, 50, and 100 rpm (Table 5). The SWCNT dispersion is more viscous than the CNS dispersion.

TABLE 5

| Sample | Viscosity | Fineness(μm) |
|---|---|---|
| 0.4% CNS dispersion | 1968/583/343 | 10 |
| 0.4% SWCNT dispersion | 5219/1450/845 | 20 |
| 0.4% MWCNT dispersion | 54/32/27 | 10 |

Coating formulations were prepared by letting down the millbase dispersions according to the formulations in Table 6 (all quantities in grams) to prepare coating formulations with 0.2%, 0.5%, 1.5%, and 6.1% pigment on a dry weight basis. The components were charged into a Dispermat CV-SIP operated at 2000 rpm in the following sequence: resin, water, pigmented millbase, followed by the remaining components, except for the dipropylene-n-butyl ether cosolvent, which was added last. The formulation was stirred for 10 min. The coatings were drawn down using 4 μm and 12 μm bird wire rods on transparent film (PP2910 from 3M), air dried for one hour, and cured for 0.5 hour at 80° C. Electrical measurements were performed as for Examples 1-9, film transparency was evaluated on an Ultrascan Pro from Hunterlab operated in total transmittance with a D65/10 light source (Table 7-4 micron coatings, Table 8-12 micron coatings).

TABLE 6

| Component | 0.2 wt % formulation | 0.5 wt % formulation | 1.5 wt % formulation | 6.1 wt % formulation |
|---|---|---|---|---|
| Neocryl ® XK-101 (40% solids) | 35 | 35 | 35 | 10 |
| BYK-024 | 0.2 | 0.2 | 0.2 | 0.2 |
| Surfynol 104DPM | 0.2 | 0.2 | 0.2 | 0.2 |
| Disperbyk346 | 0.4 | 0.4 | 0.4 | 0.4 |
| Dipropylene n-Butyl Ether | 3 | 3 | 3 | 3 |

TABLE 6-continued

| Component | 0.2 wt % formulation | 0.5 wt % formulation | 1.5 wt % formulation | 6.1 wt % formulation |
|---|---|---|---|---|
| AMP95 cosolvent | 0.3 | 0.3 | 0.3 | 0.3 |
| Deionized Water | 53.1 | 42.10 | 3.60 | 3.60 |
| Rheolate 299 | 0.3 | 0.3 | 0.3 | 0.3 |
| Millbase (0.4% pigment) | 7.5 | 18.5 | 57 | 82 |

Figure 5:
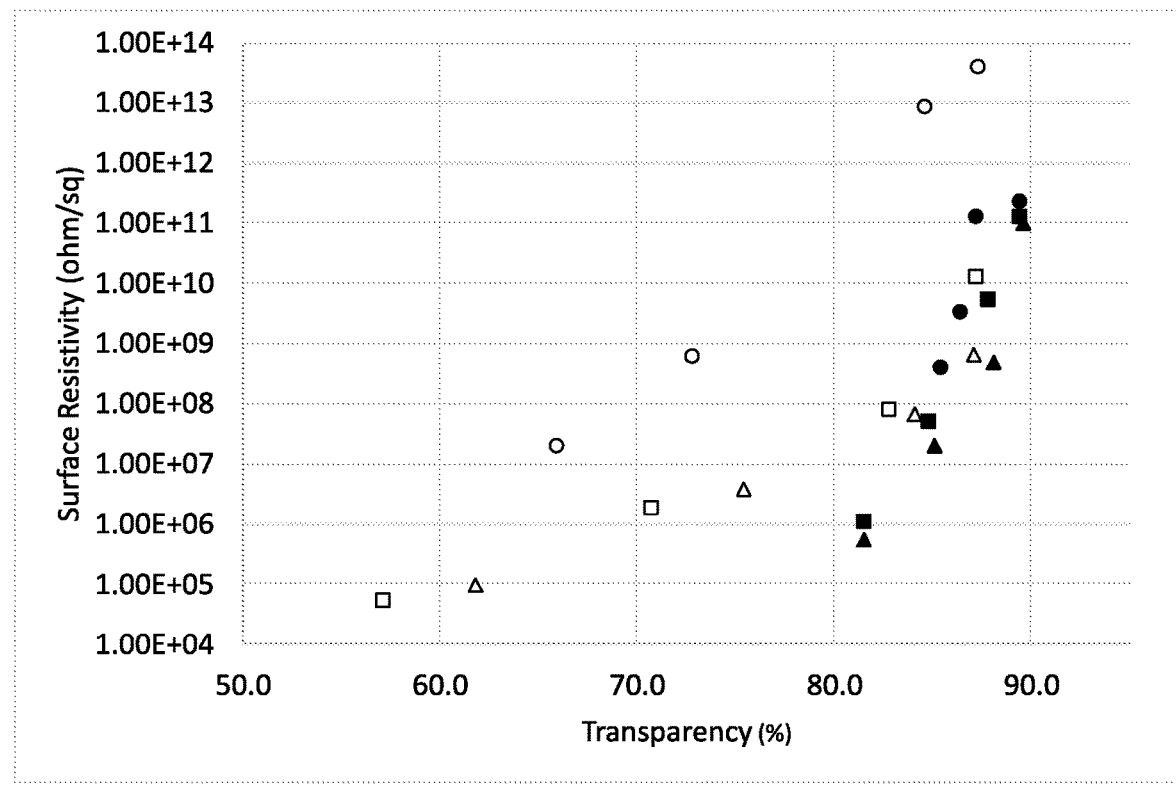
FIG. 5 is a graph of the surface resistivity of coatings prepared according to exemplary embodiments and comparative examples plotted with respect to transparency (circles=MWCNT, squares=CNS, triangles=SWCNT; hollow symbols=12 micron coatings, solid symbols=4 micron coatings).

The surface resistivity is plotted with respect to transparency in FIG. 5 (circles=MWCNT, squares=CNS, triangles=SWCNT; hollow symbols=12 micron coatings, solid symbols=4 micron coatings). At lower loadings, the MWCNT filled coatings become less resistive as loading increases. The MWCNT filled coatings are generally less resistive than the corresponding CNS filled coatings. While the performance of the SWCNT coatings was good, the millbase viscosity was higher than for the CNS millbase and the pigment grind was coarser.

TABLE 7

| | 0.2 wt % formulation | | 0.5 wt % formulation | | 1.5 wt % formulation | | 6.1 wt % formulation | |
|---|---|---|---|---|---|---|---|---|
| Pigment | Sfc. ρ (ohm/sq) | T (%) | Sfc. ρ (ohm/sq) | T (%) | Sfc. ρ (ohm/sq) | T (%) | Sfc. ρ (ohm/sq) | T (%) |
| CNS | 1.3E+11 | 89.4 | 5.5E+09 | 87.8 | 5.1E+07 | 84.8 | 1.1E+06 | 81.5 |
| MWCNT | 2.3E+11 | 89.4 | 1.3E+11 | 87.2 | 3.4E+09 | 86.4 | 4.0E+08 | 85.4 |
| SWCNT | 9.9E+10 | 89.6 | 4.8E+08 | 88.1 | 2.0E+07 | 85.1 | 5.5E+05 | 81.5 |

TABLE 8

| | 0.2 wt % formulation | | 0.5 wt % formulation | | 1.5 wt % formulation | | 6.1 wt % formulation | |
|---|---|---|---|---|---|---|---|---|
| Pigment | Sfc. ρ (ohm/sq) | T (%) | Sfc. ρ (ohm/sq) | T (%) | Sfc. ρ (ohm/sq) | T (%) | Sfc. ρ (ohm/sq) | T (%) |
| CNS | 1.3E+10 | 87.2 | 8.0E+07 | 82.8 | 1.9E+06 | 70.7 | 5.5E+04 | 57.1 |
| MWCNT | 3.9E+13 | 87.3 | 8.5E+12 | 84.6 | 6.1E+08 | 72.8 | 2.0E+07 | 65.9 |
| SWCNT | 6.5E+08 | 87.1 | 6.6E+07 | 84.1 | 3.8E+06 | 75.4 | 9.6E+04 | 61.8 |

Example 11

Butyl acetate (88.4 g), propylene glycol methyl ether acetate (88.4 g), Setal® 189XX65 (20.0 g) polyester resin and Efka™ PX4310 dispersant (2.4 g) were charged into a paint can and stirred with a Dispermat CV-SIP mixer at 1500 rpm for 15 min. CNS coated with polyethylene glycol (0.8 g, Applied Nanostructured Materials, Billerica, Massachusetts) was added while stirring, following which the stirring speed was increased to 2000 rpm for an additional 15 min. 300 g of 1 mm zirconium beads was loaded into the can. The paint can was shaken for 6 hours in a Lau Model DAS 200 Disperser. The CNS dispersion was then separated from the beads using a 75-micron paint filter. A white titania millbase was prepared in a similar manner with 15.0 wt % Setal® 189XX65 resin, 60.0 wt % Ti-Pure® R960 titania, 9.5 wt % butyl acetate, 9.5 wt % propylene glycol methyl ether acetate and 6.0 wt % DisperBYK-161 dispersing agent, except that the paint can was shaken in the Disperser for only one hour.

The resulting 0.4 wt % CNS millbase was let down into a polyester resin (Setal® 189XX65 resin from Allnex) according to the formulations in Tables 9 (all amounts in grams). The components for each formulation were charged into a Dispermat CV-SIP mixer operated at 2000 rpm in the following sequence: butyl acetate (BuAc), propylene glycol methyl ether acetate (PGMEA), resin, pigmented millbase, followed by the remaining components. The formulation was stirred for 10 min. Films were prepared on BYK-O-CHART panels using a 4 mil (101.6 micron) drawdown bar, air dried for 1 hour, and then cured at 140° C. for half hour to give coatings with a CNS content of about 0.16 wt %. Surface resistivity was measured using a Keithley 2410 four-probe source meter. At least five measurements were taken on the cured films at different locations. The results were reported in Table 9 below.

TABLE 9

| Component | Example 11 |
|---|---|
| Setal ® 189XX65 | 25.00 |
| BuAc | 11.15 |
| PGMEA | 11.15 |
| BYK-346 | 0.20 |
| TiO$_2$ Dispersion | 35.00 |
| Millbase (0.4% CNS) | 17.50 |
| Surface Resistivity (ohm/sq) | 6.50E+06 |
| Tinting Strength (L*) | 68 |

Example 12

The 0.4 wt % CNS millbase of Example 10 was let down into a polyurethane resin, (NeoRez R-2180 resin from DSM Coating Resins), an acrylic resin, and blends of the PU resin or acrylic resin with a chlorinated polypropylene (Eastman CP-310W resin) as an adhesion promoter according to the formulations in Tables 10 and 11 (all amounts in grams). The components for each formulation (60% titania dispersion according to Examples 1-9) were charged into a Dispermat CV-SIP operated at 2000 rpm in the following sequence: resin, water, pigmented millbase, followed by the remaining components, except for the dipropylene-n-butyl ether cosolvent, which was added last. The formulation was stirred for 10 min. Films were prepared on BYK-O-CHART panels using a 4 mil (101.6 micron) drawdown bar, air dried for 1 hour, and then cured at 80° C. for one hour to give coatings with a CNS content of about 0.2 wt %. Surface resistivity was measured using a Keithley 2410 four-probe source meter. At least five measurements were taken on the cured films at different locations.

TABLE 10

| Component | Example 12A | Example 12B |
|---|---|---|
| NeoRez ® R-2180 | 61.1 | 41.1 |
| Eastman ™ CP 310W | 0 | 20 |
| Disperbyk346 | 0.3 | 0.3 |
| BYK-024 | 0.2 | 0.2 |
| Dipropylene n-Butyl Ether | 3.66 | 3.66 |
| Dipropylene glycol monomethyl ether | 2.44 | 2.44 |
| Rheolate299 | 0.3 | 0.3 |
| Millbase (0.4% CNS) | 16 | 16 |
| TiO$_2$ dispersion (60%) | 16 | 16 |
| Surface Resistivity (ohm/sq) | 3.10E+06 | 4.80E+06 |

NeoRez resin from DSM Coating Resins
Disperbyk dispersant from BYK Chemie
Rheolate rheology modifier from Elementis Specialties

TABLE 11

| Component | Example 12C | Example 12D |
|---|---|---|
| Neocryl ® XK-101 | 60 | 40 |
| Eastman ™ CP 310W | 0 | 20 |
| BYK-024 | 0.2 | 0.2 |
| Surfynol 104DPM | 0.2 | 0.2 |
| Disperbyk346 | 0.4 | 0.4 |
| Dipropylene glycol monomethyl ether | 3 | 3 |
| DMEA | 0.3 | 0.3 |
| Deionized Water | 0.60 | 0.60 |
| Rheolate 299 | 0.3 | 0.3 |
| Millbase (0.4% CNS) | 17.5 | 17.5 |
| TiO$_2$ dispersion (60%) | 17.5 | 17.5 |
| Surface Resistivity (ohm/sq) | 5.80E+06 | 1.80E+06 |

Example 13

DisperBYK 163 dispersant (1 g, BYK Chemie) is mixed with 88.2 g xylene, and 110.3 g propylene glycol methyl ether acetate. CNS coated with polyethylene glycol (0.5 g, Applied Nanostructured Materials, Billerica, Massachusetts) is mixed with the solvent mixture in a beaker, then loaded into paint cans with 300 g of 1 mm zirconium beads. The paint cans are allowed to mix for 6 hours in a Lau Model DAS 20 Disperser. The CNS dispersion is then separated from the beads using a 75-micron paint filter.

BYK-346 wetting agent (0.37 g, BYK Chemie) and Cymel 325 melamine crosslinker (6.8 g, 80% active, Allnex) are combined under good agitation. The CNS dispersion and 64 g Beckosol 12-054 alkyd resin (49-51% active, Reichhold) is then added and mixed under good agitation until complete incorporation is observed. The resulting coating composition is laid down on steel panels from ACT Test Panels LLC using a 5 mil (127 micron) wet film applicator. The wet film is air dried for 10 min at ambient temperature and cured at 138° C. for 30 min. The resulting coating is expected to exhibit excellent electrical conductivity.

The foregoing description of preferred embodiments of the present invention has been presented for the purposes of illustration and description. It is not intended to be exhaustive or to limit the invention to the precise form disclosed. Modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A coating composition, comprising:
    a millbase dispersion comprising a solvent and a resin,
        wherein up to 0.5 wt % of at least one carbon nanonstructure (CNS)-derived material dispersed in the millbase dispersion and selected from the group consisting of: carbon nanostructures, fragments of carbon nanostructures, fractured carbon nanotubes, and any combination thereof,
    wherein the carbon nanostructures or fragments of carbon nanostructures include a plurality of multiwall carbon nanotubes that are crosslinked in a polymeric structure by being branched, interdigitated, entangled and/or sharing common walls,
    wherein the fractured carbon nanotubes are derived from the carbon nanostructures and are branched and share common walls with one another, and
    wherein a Brookfield viscosity of the millbase dispersion measured at room temperature at 10 rpm is less than 3000 cP,
    the resin is selected from the group consisting of acrylic, methacrylic, alkyd, polyester, urethane, epoxy, vinylchloride copolymer, phenolic, epoxy bisphenol-A, epoxy novolac, polystyrene resins, styrene-acrylic resins, polyvinyl butyral, polyolefin, and cellulosic resins, and either
    A) when the coating composition is tested according to Evaluation Method A, the resulting cured coating has a value of L* of at least 30, or
    B) when the coating composition is tested according to Evaluation Method B, the resulting cured coating exhibits transparency greater than 55% and resistivity (ohm/sq) satisfying $\log_{10}$(surface resistivity)<0.005 (transparency)$^2$−0.52(transparency)+19, where transparency is given as a percent.

2. The coating composition of claim 1, wherein the solvent is an aqueous solvent comprising at least 50% water or an organic solvent.

3. The coating composition of claim 1, which, when it is tested according to Evaluation Method A, the resulting cured coating has a surface resistivity of at most $10^7$ ohm/square.

4. The coating composition of claim 1, wherein, when the coating composition is cured to form a coating, the resulting cured coating contains from 0.10 to 10 wt % CNS-derived material.

5. The coating composition of claim 1, further comprising at least one additive selected from titania, hydrophilic fumed silica, hydrophobic fumed silica, hydrophilic precipitated silica, hydrophobic precipitated silica, clay, bentonite, talc, metal carbonates, and calcium carbonate.

6. A cured coating prepared with the coating composition of claim 1, and further comprising from 20-30 wt % titania on a dry basis and having a value of L* of at least 55.

7. A coating composition, comprising:
   a resin; and
   up to 10 wt % on a dry basis of at least one CNS-derived material dispersed in the coating composition and selected from the group consisting of: carbon nanostructures, fragments of carbon nanostructures, fractured carbon nanotubes, and any combination thereof,
   wherein the carbon nanostructures or fragments of carbon nanostructures include a plurality of multiwall carbon nanotubes that are crosslinked in a polymeric structure by being branched, interdigitated, entangled and/or sharing common walls, and
   wherein the fractured carbon nanotubes are derived from the carbon nanostructures and are branched and share common walls with one another,
   when tested according to Evaluation Method A, the resulting cured coating has a surface resistivity of at most $10^7$ ohm/square and either
   A) when the coating composition is tested according to Evaluation Method A, the resulting cured coating has a value of L* of at least 30, or
   B) when the coating composition is tested according to Evaluation Method B, the resulting cured coating exhibits transparency greater than 55% and resistivity (ohm/sq) satisfying $\log_{10}$(surface resistivity)<0.005 (transparency)$^2$−0.52(transparency)+19, where transparency is given as a percent.

8. The coating composition of claim 7, further comprising at least one additive selected from titania, hydrophilic fumed silica, hydrophobic fumed silica, hydrophilic precipitated silica, hydrophobic precipitated silica, clay, bentonite, talc, metal carbonates, and calcium carbonate.

9. A cured coating produced by curing the coating composition of claim 7 and comprising from 0.01 wt % to 10 wt % CNS-derived material.

10. The cured coating of claim 9, further comprising from 20-30 wt % titania and having a value of L* of at least 55.

11. A method of producing a coating composition, comprising:
   providing a millbase comprising at least one CNS-derived material dispersed in a solvent and selected from the group consisting of: carbon nanostructures, fragments of carbon nanostructures, fractured carbon nanotubes, and any combination thereof,
   wherein the carbon nanostructures or fragments of carbon nanostructures include a plurality of multiwall carbon nanotubes that are crosslinked in a polymeric structure by being branched, interdigitated, entangled and/or sharing common walls,
   wherein the fractured carbon nanotubes are derived from the carbon nanostructures and are branched and share common walls with one another,
   combining the CNS millbase with a resin to form a coating composition which, when it is tested according to Evaluation Method A, the resulting cured coating has a surface resistivity of at most $10^7$ ohm/square, and either
   A) when the coating composition is tested according to Evaluation Method A, the resulting cured coating has a value of L* of at least 30, or
   B) when the coating composition is tested according to Evaluation Method B, the resulting cured coating exhibits transparency greater than 55% and resistivity (ohm/sq) satisfying $\log_{10}$(surface resistivity)<0.005 (transparency)$^2$−0.52(transparency)+19, where transparency is given as a percent.

12. The method of claim 11, wherein the millbase comprises up to 0.5 wt % CNS-derived material.

13. The method of claim 11, wherein the solvent is an aqueous solvent comprising at least 50 wt % water or an organic solvent.

14. The method of claim 11, wherein the millbase has a Brookfield viscosity measured at room temperature at 10 rpm of less than 3000 cP.

* * * * *

UNITED STATES PATENT AND TRADEMARK OFFICE
CERTIFICATE OF CORRECTION

PATENT NO. : 11,912,898 B2
APPLICATION NO. : 17/910174
DATED : February 27, 2024
INVENTOR(S) : Zhangliang Gui et al.

It is certified that error appears in the above-identified patent and that said Letters Patent is hereby corrected as shown below:

In the Claims

At Column 27, Line 25, "10'" should read -- $10^7$ --

Signed and Sealed this
Twenty-sixth Day of March, 2024

Katherine Kelly Vidal
*Director of the United States Patent and Trademark Office*